(12) United States Patent
Fujimori

(10) Patent No.: US 10,856,216 B2
(45) Date of Patent: Dec. 1, 2020

(54) COMMUNICATION APPARATUS, CONTROL METHOD, AND RECORDING MEDIUM

(71) Applicant: CANON KABUSHIKI KAISHA, Tokyo (JP)

(72) Inventor: Yuki Fujimori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 16/175,282

(22) Filed: Oct. 30, 2018

(65) Prior Publication Data

US 2019/0132791 A1 May 2, 2019

(30) Foreign Application Priority Data

Oct. 31, 2017 (JP) ................................. 2017-211158

(51) Int. Cl.
| | |
|---|---|
| *H04W 48/08* | (2009.01) |
| *H04W 48/18* | (2009.01) |
| *H04W 48/16* | (2009.01) |
| *H04L 29/08* | (2006.01) |
| *H04W 8/00* | (2009.01) |
| *H04W 84/12* | (2009.01) |
| *H04W 84/18* | (2009.01) |

(52) U.S. Cl.
CPC ............ *H04W 48/18* (2013.01); *H04L 67/16* (2013.01); *H04W 8/005* (2013.01); *H04W 48/16* (2013.01); *H04W 84/12* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2014/0080481 A1* | 3/2014 | Abraham | H04W 74/0808 455/434 |
| 2015/0036540 A1 | 2/2015 | Kasslin | |
| 2015/0098388 A1* | 4/2015 | Fang | H04W 8/005 370/328 |
| 2015/0131529 A1 | 5/2015 | Zhou | |
| 2015/0200811 A1 | 7/2015 | Kasslin | |
| 2016/0249200 A1* | 8/2016 | Liu | H04L 12/189 |
| 2016/0286476 A1 | 9/2016 | Patil | |
| 2016/0309493 A1* | 10/2016 | Shmukler | H04W 76/23 |
| 2016/0345242 A1 | 11/2016 | Kim | |
| 2016/0353269 A1 | 12/2016 | Kasslin | |
| 2017/0070938 A1* | 3/2017 | Uno | H04W 36/0088 |
| 2017/0347255 A1 | 11/2017 | Liu | |
| 2018/0027487 A1 | 1/2018 | Pang | |
| 2019/0124611 A1* | 4/2019 | Pang | H04W 56/00 |
| 2019/0132785 A1 | 5/2019 | Fujimori | |
| 2019/0132791 A1 | 5/2019 | Fujimori | |
| 2019/0380022 A1* | 12/2019 | Sambe | H04L 67/303 |

\* cited by examiner

*Primary Examiner* — Mohammad S Adhami
(74) *Attorney, Agent, or Firm* — Canon U.S.A., Inc. IP Division

(57) ABSTRACT

A communication apparatus is provided and is capable of selecting between a mode in which a service search is performed in a single network and a mode in which a service search is performed in a plurality of networks selects which mode to perform a service search in based on a predetermined condition, and performs a service search in the selected mode.

23 Claims, 12 Drawing Sheets

COMMUNICATION APPARATUS, CONTROL METHOD, AND RECORDING MEDIUM

BACKGROUND

Field

The present disclosure relates to a service search of a communication apparatus.

Description of the Related Art

The Wi-Fi Alliance has drawn up the Wi-Fi Neighbor Awareness Network (NAN) standard in recent years. The Wi-Fi NAN standard is a communication standard for detecting other communication apparatuses and services provided by other communication apparatuses with saved power. According to the Wi-Fi NAN standard, communication apparatuses that perform communication compliant with the Wi-Fi NAN standard (hereinafter, NAN devices) synchronously perform transmission and reception of predetermined signals with each other in a predetermined period. The predetermined period in which NAN devices perform the transmission and reception of predetermined signals with each other is referred to as a Discovery Window (DW). A network constituted by NAN devices sharing DWs is referred to as a NAN cluster. A NAN device can search for and use services provided by other NAN devices participating in the same NAN cluster by transmitting and receiving signals to/from the other NAN devices.

A Cluster Grade (CG) is set for each NAN cluster. A NAN device joins a NAN cluster having a higher CG. The Wi-Fi NAN standard defines that if a NAN device detects a NAN cluster having a CG higher than that of the NAN cluster in which the NAN device participates, the NAN device joins the detected NAN cluster.

United States Patent Publication Application No. 2015/0036540 discusses determining a NAN cluster to be joined based on a predetermined condition if a NAN device participating in a NAN cluster detects a plurality of other NAN clusters.

If there is a plurality of NAN clusters, participation of a NAN device in a single NAN cluster can be disadvantageous because the NAN device is unable to detect services provided by other NAN devices participating in the NAN cluster(s) in which the NAN device does not participate. However, there is an advantage that the power consumption of the NAN device is suppressed since the NAN device only needs to transmit and receive signals in the DWs of the single NAN cluster in which the NAN device participates.

On the other hand, if there is a plurality of NAN clusters and a NAN device joins a plurality of NAN clusters, the NAN device needs to transmit and receive signals in the DWs of the respective NAN clusters. This disadvantageously increases the power consumption. Despite the disadvantage, there is an advantage that the NAN device can perform a service search in a greater number of NAN clusters.

SUMMARY

The present disclosure is directed to providing a communication apparatus which, if there is a plurality of networks (NWs), can selectively perform a service search in a single NW or in a plurality of NWs.

According to an aspect of the disclosure, a communication apparatus includes a participation unit configured to join a network in which participating apparatuses perform communication using a predetermined signal therebetween, a first search unit configured to, in a case where there are a first network in which participating apparatuses perform communication using the predetermined signal therebetween and a second network in which participating apparatuses perform communication using the predetermined signal therebetween, join either the first and second networks via the participation unit based on a result of comparison between a first value set for the first network and a second value set for the second network, perform a service search in the joined network, and not perform a service search in the other network by not joining the other network, a second search unit configured to, in a case where there are the first and second networks, join the first and second networks via the participation unit, perform a service search in the first network, and perform a service search in the second network as well, and a selection unit configured to select whether to perform a service search by the first search unit or perform a service search by the second search unit.

Further features will become apparent from the following description of exemplary embodiments with reference to the attached drawings.

DESCRIPTION OF THE EMBODIMENTS

Exemplary embodiments will be described in detail below with reference to the accompanying drawings. Configurations described in the following exemplary embodiments are just examples, and the disclosure is not limited to the following configurations.

Figure 1:
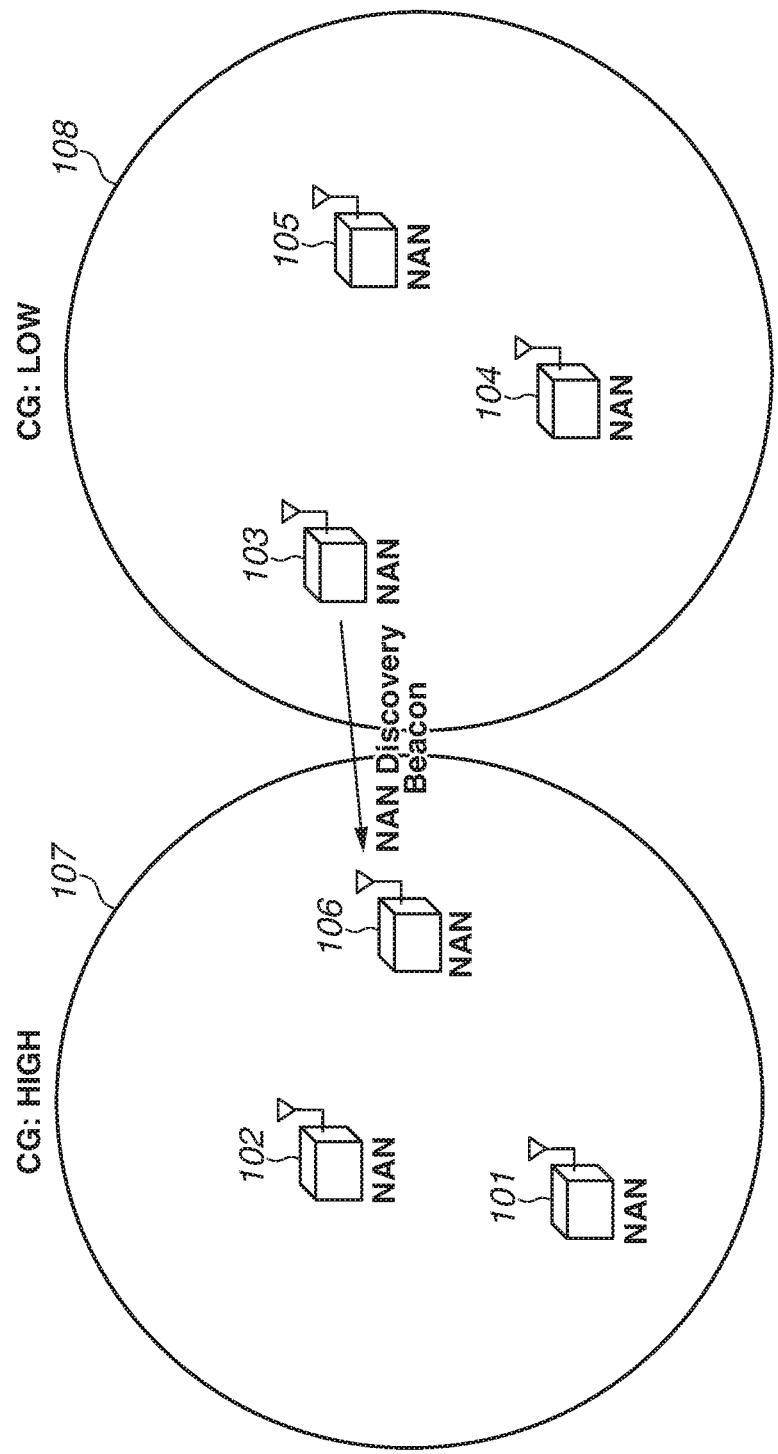
FIG. 1 is a diagram illustrating a network configuration of networks in which Neighbor Awareness Network (NAN) devices participate.

A first exemplary embodiment will be described below. FIG. 1 is a diagram illustrating a configuration of NWs which a NAN device 106 according to the present exemplary embodiment joins.

In the present exemplary embodiment, NAN devices 101, 102, 103, 104, 105, and 106 perform wireless communication by a wireless communication method compliant with the Wi-Fi NAN standard. Aside from wireless communication compliant with the Wi-Fi NAN standard, the NAN devices 101 to 106 may each perform communication by wireless communication methods compliant with the Institute of Electrical and Electronics Engineers (IEEE) 802.11 series standards other than the wireless communication compliant with the Wi-Fi NAN standard. Communication methods compliant with other wireless communication methods, such as Bluetooth (registered trademark), ultra-wideband (UWB), and Zigbee, may also be used. UWB techniques include Wireless Universal Serial Bus (USB), Wireless 1394, and WiNet. Communication methods compliant with wired communication methods such as the Ethernet may also be used.

The NAN device 103 is a printing apparatus which provides image and document print services. The NAN device 103 may be a printing apparatus such as a printer and a multifunction peripheral (MFP). The NAN device 103 may be a providing apparatus for providing other services, such as a screen share service, in addition to or instead of the print services. Other specific examples of the NAN device 103 may include, but not limited to, a tablet, a display, and a projector.

The NAN device 106 is a mobile terminal which searches for an apparatus that provides a print service. The NAN device 106 may be any communication apparatus that searches for a service provided by another apparatus, like a smartphone, a tablet, and a personal computer (PC). Specific examples may include, but not limited to, communication apparatuses such as a smartphone, a tablet, a PC, and a head-mounted display. The NAN devices 101, 102, 104, and 105 are arbitrary communication apparatuses.

In the present exemplary embodiment, the NAN devices 101, 102, and 106 participate in a NAN cluster 107. The NAN devices 103, 104, and 105 participate in a NAN cluster 108.

NAN devices participating in the same NAN cluster share a period for transmitting and receiving a NAN Synchronization Beacon. The period in which the signal is transmitted and received (period in which communication using the signal is performed) is referred to as a discovery window (DW). The NAN Synchronization Beacon is a synchronization signal that enables synchronization of the NAN devices participating in the same NAN cluster. In the present exemplary embodiment, a DW has a length of 16 time units (TUs). The interval from the beginning of a DW to the beginning of the next DW is 512 TUs. One TU has a duration of 1024 μs. The length and interval of DWs are not limited thereto.

NAN devices participating in a NAN cluster are each assigned the role of a Master or a Non-Master. A NAN device assigned the role of a Non-Master is put in a Sync state or a Non-Sync state. A NAN device assigned the role of a Master transmits a NAN Synchronization Beacon during DWs, and transmits a NAN Discovery Beacon outside DWs. A NAN device that is assigned the role of a Non-Master and is in a Sync state transmits a NAN Synchronization Beacon during DWs, but not a NAN Discovery Beacon. A NAN device that is assigned the role of a Non-Master and is in a Non-Sync state does not transmit a NAN Synchronization Beacon or a NAN Discovery Beacon during DWs. NAN devices, even in a Non-Sync state, share DWs in the NAN cluster in which the NAN devices participate.

The NAN Discovery Beacon is a signal transmitted outside DWs. The NAN Discovery Beacon is an informing signal for informing NAN devices participating in other NAN clusters and NAN devices not participating in any NAN cluster of the presence of the NAN cluster in which the NAN device itself participates.

The roles of NAN devices are determined by Master Ranks of the respective NAN devices. The Master Rank is determined based on a Master Preference, a Random Factor, and a NAN Interface Address. The Master Preference is a value set for each NAN device. The higher the Master Preference, the more likely the NAN device is to be a Master in a NAN cluster.

The Master Preference may be determined by any method. For example, NAN devices powered by commercial power supply and NAN devices having high clock stability may be given a high Master Preference. NAN devices expected to be used on the move, like a mobile terminal, may be given a low Master Preference.

The Random Factor is a value set at random. Any one of integers 0 to 255 is selected at random. The NAN Interface Address is a value based on the media access control (MAC) address of the NAN device.

The Master Rank is determined based on the following Eq. 1:

Master Rank=Master Preference*2^56+Random Factor*2^48+MAC[5]*2^40+ . . . +MAC[0]  (Eq. 1)

MAC[0] to MAC[5] in Eq. 1 represent respective 8-bit segments from the top of the MAC address (48 bits) of the NAN device.

The higher the Master Rank determined based on the foregoing Eq. 1, the more likely the NAN device is to be a Master in a NAN cluster. An Anchor Master refers to a NAN device having the highest Master Rank in a NAN cluster.

In the present exemplary embodiment, the NAN devices 101, 102, and 106 participate in the NAN cluster 107. The NAN devices 103, 104, and 105 participate in the NAN cluster 108. A CG is set for each NAN cluster. The CG is set by the following Eq. 2:

$CG=2^64*A1+A2.$  (Eq. 2)

In Eq. 2, A1 represents the Master Preference of the Anchor Master in the NAN cluster. A2 represents a Time Synchronization Function (TSF) value. The TSF is a time stamp included in a NAN Synchronization Beacon, and is used for NAN devices in a NAN cluster to synchronize with an Anchor Master.

A NAN device participating in a NAN cluster detects another NAN cluster by receiving a NAN Discovery Beacon transmitted from a NAN device participating in another NAN cluster. A NAN device may detect another NAN cluster by receiving a NAN Synchronization Beacon.

A NAN device joins a NAN cluster having a higher CG setting. Specifically, if a NAN device detects a NAN cluster and the CG of the detected NAN cluster is higher than that of the NAN cluster in which the NAN device participates, the NAN device joins the detected NAN cluster and leaves the original NAN cluster. Such an operation of the NAN device is called merging. If the NAN device that has detected another NAN cluster has the role of a Master, the NAN device may transmit a NAN Synchronization Beacon about the newly detected NAN cluster during the DWs of the NAN cluster in which the NAN device has so far participated. The same applies to cases where the NAN device detecting another NAN cluster has the role of a Non-Master and is in a Sync state. The other NAN devices participating in the NAN cluster in which the NAN device has participated then perform signal transmission and reception in the DWs of the newly detected NAN cluster. In the present exemplary embodiment, the NAN cluster 108 has a CG lower than that of the NAN cluster 107.

Even if a NAN device participating in a NAN cluster detects another NAN cluster having a CG higher than that of the NAN cluster in which the NAN device participates, the NAN device does not always need to merge with the detected NAN cluster. Specifically, if NAN devices in the NAN cluster in which the NAN device participates are performing data transmission and reception with each other via wireless communication compliant with the Wi-Fi NAN standard, the NAN device does not need to merge with the NAN cluster of higher CG. Instead of the wireless communication compliant with the Wi-Fi NAN standard, the data transmission and reception may be performed via wireless communication compliant with IEEE 802.11 series standards other than the Wi-Fi NAN standard or via wireless communication compliant with other wireless communication methods such as Bluetooth, UWB, and Zigbee. In the present exemplary embodiment, the NAN device 103 in the NAN cluster 108 performs data transmission and reception with at least either one of the NAN devices 104 and 105. Although the NAN cluster 108 has a CG lower than that of the NAN cluster 107, the NAN devices 103, 104, and 105 participating in the NAN cluster 108 therefore do not need to merge with the NAN cluster 107 when the NAN cluster 107 is detected.

A NAN device can search for services provided by other NAN devices participating in the NAN cluster in which the NAN device participates. Specifically, the NAN device can cause the other NAN devices participating in the same NAN cluster to transmit a Publish message by transmitting a Subscribe message in a DW. The Subscribe message is an inquiry signal for inquiring of the other NAN devices participating in the same NAN cluster what services can be provided. The Publish message is a notification signal for notifying the NAN devices participating in the same NAN cluster of what services the NAN device itself can provide. Such a service search is called a solicited service search.

NAN devices can autonomously transmit a Publish message without receiving a Subscribe message. Such a service search is called an unsolicited service search.

In a solicited service search, the NAN device transmitting a Subscribe message can perform a service search by specifying a desired service. A NAN device receiving the Subscribe message transmits a Publish message if the NAN device itself can provide the specified service. The NAN device transmitting a Subscribe message may transmit the Subscribe message without specifying a desired message or by specifying a wildcard. In such a case, a NAN device receiving the Subscribe message makes a notification about all services the NAN device can provide by using a Publish message. The NAN device may make a notification about only a specific service or services, such as a service corresponding to an application running on the NAN device and a service determined by instructions from a user.

In an unsolicited service search, a NAN device makes a notification about all services the NAN device can provide by using a Publish message. The NAN device may make a notification only about a specific service or services, such as a service corresponding to an application running on the NAN device and a service determined based on instructions from a user.

A NAN device forms a NAN cluster when starting wireless communication compliant with the Wi-Fi NAN standard. The NAN device forming a NAN cluster sets the Master Preference and Random Factor thereof at 0 for a predetermined time. The CG of the NAN cluster formed by the NAN device is therefore extremely low during the predetermined time. After a lapse of the predetermined time or when merging with a NAN cluster in which the Anchor Master has a Master Preference higher than 0, the NAN device makes the Master Preference thereof higher than 0.

A NAN device does not need to form a NAN cluster when starting wireless communication compliant with the Wi-Fi NAN standard. When starting wireless communication compliant with the Wi-Fi NAN standard, such a NAN device detects a NAN cluster and joins the detected NAN cluster. If a plurality of NAN clusters is detected, the NAN device joins a NAN cluster having the highest CG. The NAN device may join a NAN cluster that is the first detected or a NAN cluster that is at the shortest distance.

Figure 2:
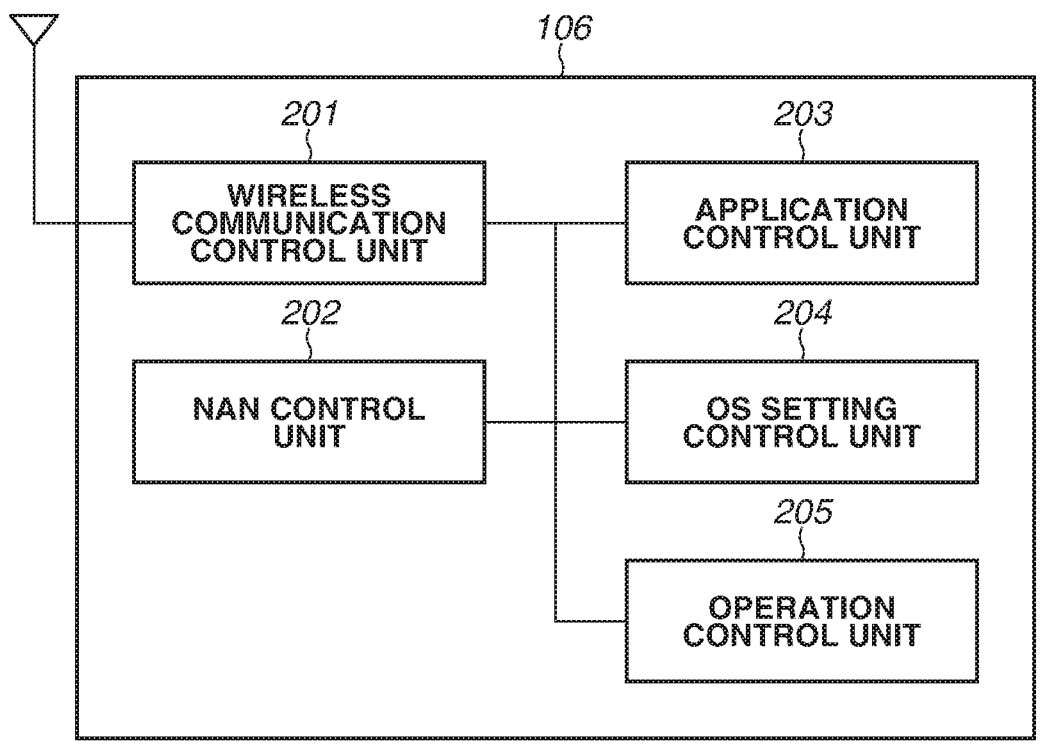
FIG. 2 is a diagram illustrating a functional configuration of a NAN device.

FIG. 2 is a diagram illustrating a functional configuration of the NAN device 106. The NAN devices 101, 102, 103, 104, and 105 have a functional configuration similar to that of the NAN device 106.

A wireless communication control unit 201 controls transmission and reception of wireless signals with other NAN devices and communication apparatuses capable of wireless communication. The wireless communication control unit 201 controls wireless communication by wireless communication methods compliant with the IEEE 802.11 series standards including the Wi-Fi NAN standard.

A NAN control unit 202 performs control compliant with the Wi-Fi NAN standard on the NAN device 106, and controls a start and end of wireless communication compliant with the Wi-Fi NAN standard. The NAN control unit 202 also performs control on a service search. The NAN control unit 202 controls the wireless communication control unit 201 based on a participation mode which is determined by selection processing of an operation mode of the NAN device 106 to be described below. The selection processing of the operation mode of the NAN device 106 will be described in detail in FIG. 4. The NAN control unit 202 reduces the power consumption of a communication unit 306 to be described below to enhance power saving performance by disabling the wireless communication of the wireless communication control unit 201 for a predetermined period. The predetermined period refers to a period from the end of a DW to the start of the next DW. If a NAN Discovery Beacon is transmitted or data transmission and reception is performed outside DWs, the NAN control unit 202 may enable wireless communication during the transmission of the signal or during the transmission and reception of data.

An application control unit 203 instructs the NAN control unit 202 to control the start and end of wireless communication compliant with the Wi-Fi NAN standard, based on processing of an application. The application control unit 203 also controls the formation of a network with a NAN device or devices detected by wireless communication compliant with the Wi-Fi NAN standard, and transmission and reception of data. Suppose, for example, that the user of the NAN device 106 activates a print service application that can use wireless communication compliant with the Wi-Fi NAN standard. In such a case, the application control unit 203 instructs the NAN control unit 202 to start wireless communication compliant with the Wi-Fi NAN standard. If the NAN control unit 202 controls the wireless communication control unit 201 and detects another NAN device capable of providing a print service, the NAN control unit 202 forms a network compliant with the Wi-Fi NAN standard with the detected NAN device. The NAN device 106 performs transmission and reception of print data via the formed network. If the user ends the print service application, the application control unit 203 instructs the NAN control unit 202 to end the wireless communication compliant with the Wi-Fi NAN standard. The network to perform data transmission and reception may be one using wireless communication compliant with IEEE 802.11 series standards other than the Wi-Fi NAN standard or one using wireless communication compliant with other wireless communication methods such as Bluetooth, UWB, and Zigbee.

An operating system (OS) setting control unit 204 controls settings related to OS functions common among applications running on the NAN device 106. For example, as a setting of the OS functions, a start and end of wireless communication compliant with the IEEE 802.11 series standards including the Wi-Fi NAN standard may be set.

An operation control unit 205 manages operations made by the user of the NAN device 106 on an input unit 304 to be described below, and transmits needed signals to the other control units 201 to 204 based on the operations.

Figure 3:
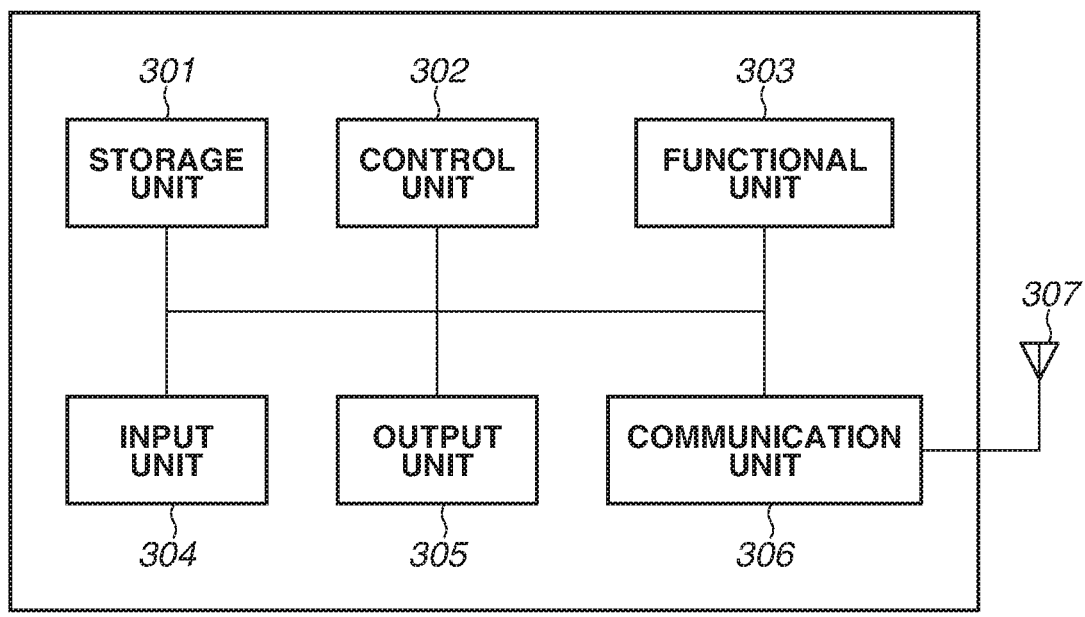
FIG. 3 is a diagram illustrating a hardware configuration of the NAN device.

FIG. 3 illustrates a hardware configuration of the NAN device 106. The NAN devices 101, 102, 103, 104, and 105 have a hardware configuration similar to that of the NAN device 106.

A storage unit 301 includes one or more memories such as a read-only memory (ROM) and a random access memory (RAM). The storage unit 301 stores computer programs for performing various operations to be described below, and various types of information such as communication parameters for wireless communication. Aside from memories such as a ROM and a RAM, storage media such as a flexible disk, a hard disk, an optical disk, a magneto-optical disk, a Compact Disc Read-Only Memory (CD-ROM), a Compact Disc-Recordable (CD-R), a magnetic tape, a nonvolatile memory card, and a digital versatile disc (DVD) may be used for the storage unit 301. The storage unit 301 may include a plurality of memories.

A control unit 302 includes one or more processors such as a central processing unit (CPU) and a micro processing unit (MPU) which function as a computer. The control unit 302 controls the entire NAN device 106 by executing the computer programs stored in the storage unit 301. The control unit 302 may control the entire NAN device 106 by cooperation of the programs and an OS stored in the storage unit 301. The control unit 302 may include a plurality of processors like a multicore processor, and control the entire NAN device 106 by using the plurality of processors.

The control unit 302 controls a functional unit 303 to perform predetermined processing such as imaging and browsing of contents. The functional unit 303 is hardware for the NAN device 106 to perform the predetermined processing. For example, if the NAN device 106 is a camera, the functional unit 303 is an imaging unit and performs imaging processing. If the NAN device 106 is a printing apparatus, the functional unit 303 is a printing unit and performs print processing. For example, if the NAN device 106 is a projector, the functional unit 303 is a projection unit and performs projection processing. Data to be processed by the functional unit 303 may be stored in the storage unit 301, or received from another NAN device via the communication unit 306 to be described below.

The input unit 304 accepts various operations from the user. An output unit 305 makes various outputs to the user via a monitor screen and/or a speaker. Aside from an on-screen display, the outputs of the output unit 305 may include a sound output through a speaker and a vibration output. The input unit 304 and the output destination of the output unit 305 may be implemented by a single module by using a touch panel. The input unit 304 and the output unit 305 may be integrated with or separate from the NAN device 106. The NAN device 106 does not need to include the input unit 304 or the output unit 305.

The communication unit 306 controls wireless communication compliant with the IEEE 802.11 series standards including the Wi-Fi NAN standard, and controls Internet Protocol (IP) communication. The communication unit 306 controls an antenna 307 to transmit and receive wireless signals for wireless communication.

The NAN device 106 transmits and receives data, such as image data, document data, and video data to/from other NAN devices via the communication unit 306. The communication unit 306 has a transmission function of transmitting data and a reception function of receiving data, and can switch the functions between enabled and disabled according to instructions of the control unit 302. The transmission and reception functions each consume power when enabled. When disabled, the transmission and reception functions each do not consume power or can operate with lower power consumption than when enabled.

Figure 4:
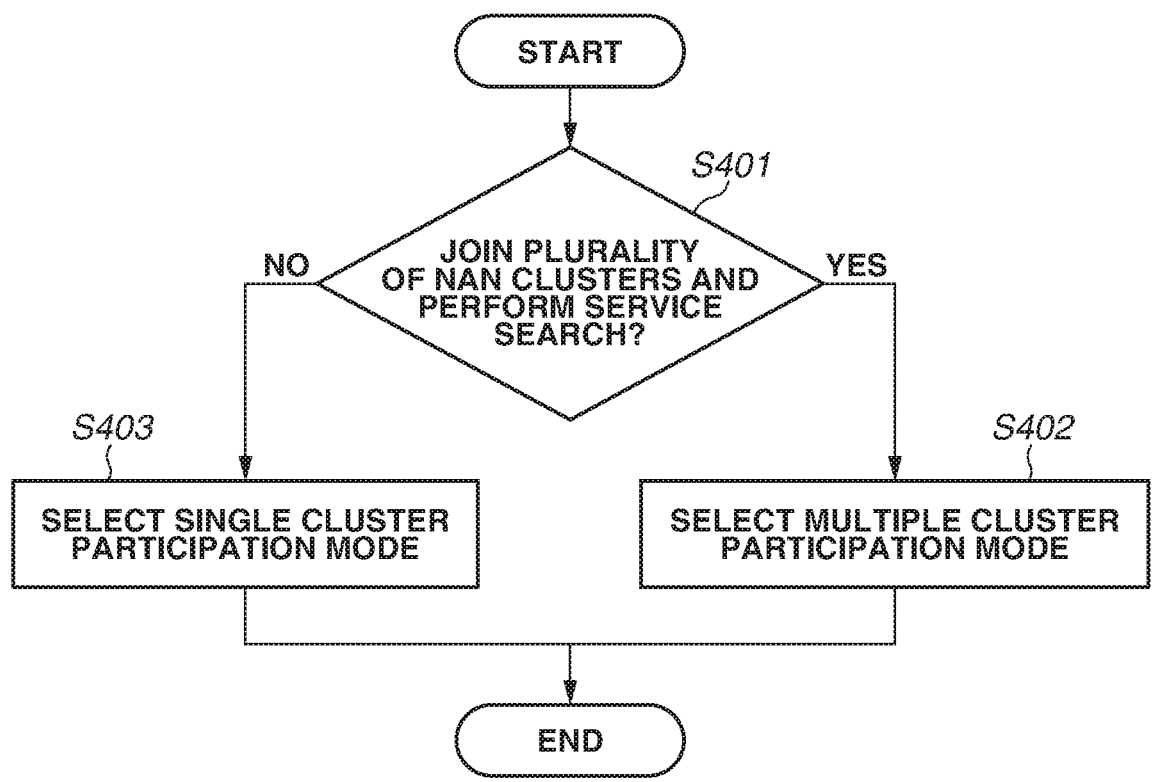
FIG. 4 is a flowchart illustrating processing performed when the NAN device selects an operation mode.

FIG. 4 is a flowchart illustrating processing that is implemented by the control unit 302 reading and executing a program stored in the storage unit 301 when the NAN device 106 selects an operation mode.

The flow of the present flowchart is started when the NAN device 106 starts wireless communication compliant with the Wi-Fi NAN standard. The wireless communication compliant with the Wi-Fi NAN standard is stared, for example, based on activation of the print service application of the NAN device 106. Here, the wireless communication compliant with the Wi-Fi NAN standard may be started when the activation of the application is started, in process, or completed, or in response to an activation instruction for the application. The service to be provided by the application activated here is not limited to a print service. The wireless communication compliant with the Wi-Fi NAN standard may be started based on a change in the OS settings of the NAN device 106. The wireless communication compliant with the Wi-Fi NAN standard may be started based on power-on of the NAN device 106. The present flowchart may be started based on activation of a specific application on the NAN device 106 or a change in the OS settings. The flowchart may be started based on participation of the NAN device 106 in a NAN cluster.

In step S401, the control unit 302 of the NAN device 106 determines whether to join a plurality of NAN clusters and perform a service search at high speed. The control unit 302 of the NAN device 106 makes the determination based on user instructions. If the control unit 302 of the NAN device 106 needs to actively search for a desired service at high speed, the determination is yes. If power saving has higher priority than service detection, the determination is no. For example, if an application using some service is running on the NAN device 106, the control unit 302 of the NAN device 106 may determine to join a plurality of NAN clusters and search for the service. On the other hand, if the wireless communication compliant with the Wi-Fi NAN standard is started based on power-on of the NAN device 106, the determination by the control unit 302 of the NAN device 106 may be no so that a service search is performed with saved power. If the wireless communication compliant with the Wi-Fi NAN standard is started due to a change in the OS settings of the NAN device 106, the determination by the control unit 302 of the NAN device 106 may be no. Suppose, for example, that the user of the NAN device 106 activates the print service application installed on the NAN device 106 using the input unit 304 and thereby wireless communication compliant with the Wi-Fi NAN standard is started. In such a case, the user is likely to want to detect a print service at high speed. The determination in step S401 is therefore yes, and the control unit 302 of the NAN device 106 selects a multiple cluster participation mode (high speed search mode). On the other hand, suppose that the user of the NAN device 106 changes an OS setting of the NAN device 106 from the input unit 304 and thereby wireless communication compliant with the Wi-Fi NAN standard is started. In such a case, the user can be considered to expect a service search with saved power rather than high-speed detection of a specific service. The determination in step S401 is then no, and the control unit 302 of the NAN device 106 selects a single cluster participation mode (power saving search mode). The single cluster participation mode is also selected if the NAN device 106 starts wireless communication compliant with the Wi-Fi NAN standard based on power-on of the NAN device 106 by the user of the NAN device 106. Such selection examples are just examples, and which search mode to be selected depending on how the wireless communication compliant with the Wi-Fi NAN standard is started is not limited thereto.

In step S401, if the control unit 302 of the NAN device 106 determines to join a plurality of NAN clusters and perform a service search (YES in step S401), the processing proceeds to step S402. In step S402, the control unit 302 selects the multiple cluster participation mode. The flow of the present flowchart is ended. On the other hand, if the control unit 302 of the NAN device 106 determines not to join a plurality of NAN clusters or perform a service search (NO in step S401), the processing proceeds to step S403. In step S403, the control unit 302 selects the single cluster participation mode. The flow of the present flowchart is ended. That the NAN device 106 does not join a plurality of NAN clusters or perform a service search means that the NAN device 106 joins a single NAN cluster and performs a service search.

If the single cluster participation mode is selected, the NAN device 106 detects and merges with a NAN cluster having a CG higher than that of the NAN cluster in which the NAN device 106 participates. If the NAN device 106 informs the NAN cluster in which the NAN device 106 has originally participated of information about the new NAN cluster to join, the NAN device 106 temporarily enters a state of participating in two NAN clusters. Such a case shall also be included in the single cluster participation mode of joining a single NAN cluster and performing a service search.

Figure 5:
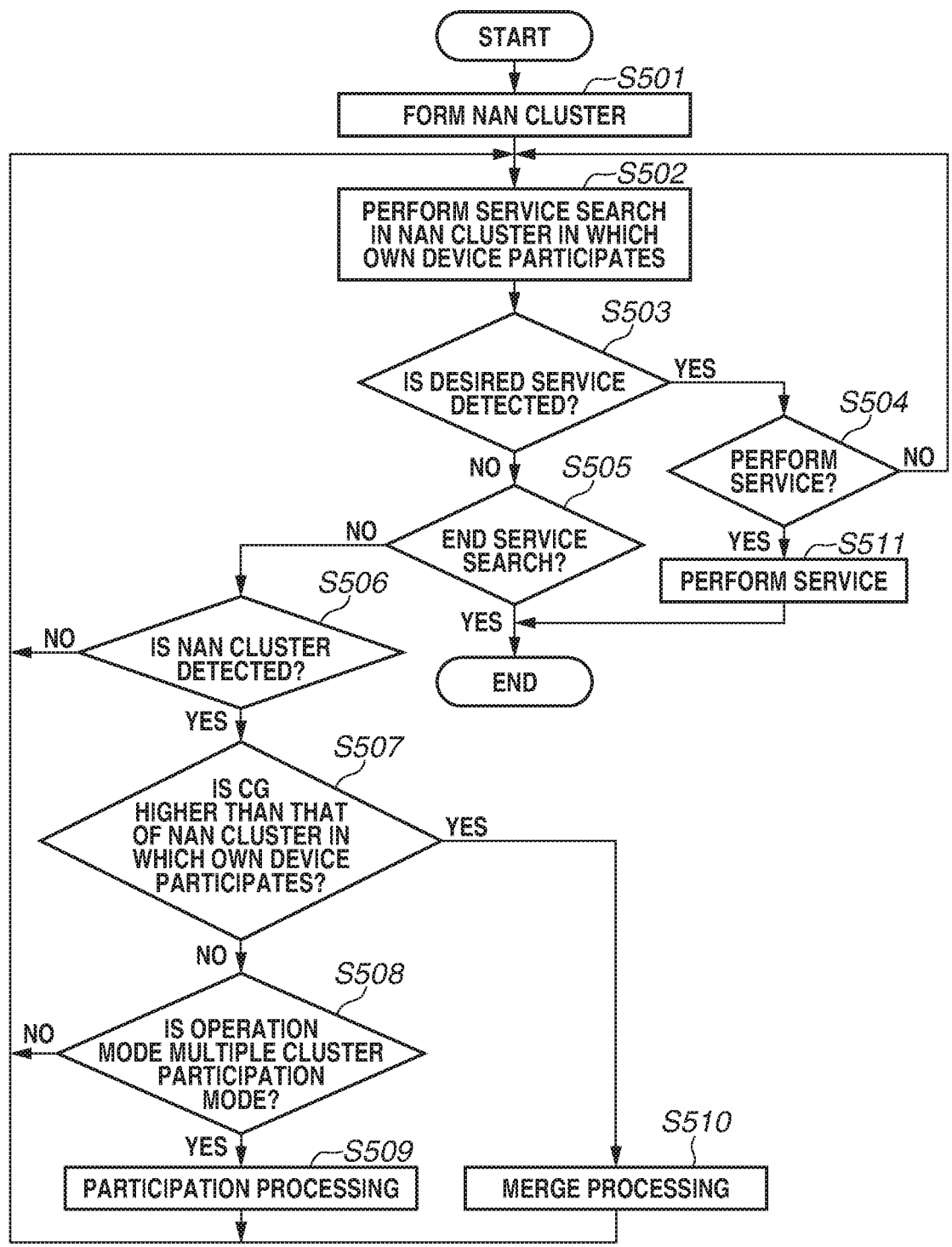
FIG. 5 is a flowchart illustrating processing performed when the NAN device forming a NAN cluster performs a service search.

FIG. 5 is a flowchart illustrating processing that is implemented by the control unit 302 reading and executing a program stored in the storage unit 301 when the NAN device 106 forming a NAN cluster performs a service search.

The present flowchart is started when the NAN device 106 starts wireless communication compliant with the Wi-Fi NAN standard. The wireless communication compliant with the Wi-Fi NAN standard is started, for example, based on activation of the print service application of the NAN device 106. The service to be provided by the application activated here is not limited to a print service. The wireless communication compliant with the Wi-Fi NAN standard may be started based on a change in the OS settings of the NAN device 106. The wireless communication compliant with the Wi-Fi NAN standard may be started based on power-on of the NAN device 106. If the starting trigger is the same as that for the flowchart of FIG. 4, the flow of the flowchart of FIG. 4 is started first. The flow of the present flowchart is started after that of FIG. 4 is ended. The NAN device 106 may perform the processing of the flowcharts of FIGS. 4 and 5 in parallel.

In step S501, if wireless communication compliant with the Wi-Fi NAN standard is started, the control unit 302 of the NAN device 106 initially forms a NAN cluster. In step S502, the control unit 302 of the NAN device 106 performs a service search on NAN devices in the NAN cluster in which the NAN device 106 participates. The NAN device 106 performs a solicited service search. Specifically, the NAN device 106 transmits, to other NAN devices participating in the NAN cluster in which the NAN device 106 participates, a Subscribe message for inquiring whether a desired service can be provided. If another NAN device receiving the Subscribe message can provide the desired service, the NAN device transmits a Publish message to the NAN device 106.

In step S503, the control unit 302 of the NAN device 106 determines whether a NAN device capable of providing the desired service is detected in the NAN cluster in which the NAN device 106 participates. Specifically, the control unit 302 determines whether a Publish message is received before a lapse of a predetermined time since the transmission of the Subscribe message. If a Publish message is received before the lapse of the predetermined time, the control unit 302 determines that the desired service is detected. If no Publish message is received before the lapse of the predetermined time, the control unit 302 determines that the desired service is unable to be detected. If the desired service is detected (YES in step S503), the processing proceeds to step S504. In step S504, the control unit 302 of the NAN device 106 determines whether to perform the detected service. If the control unit 302 determines not to perform the detected service (NO in step S504), the processing returns to step S502. On the other hand, if the control unit 302 determines to perform the detected service (YES in step S504), the processing proceeds to step S511. In step S511, the control unit 302 of the NAN device 106 performs the service. The flow of the present flowchart is ended. For example, if the NAN device providing the detected service is at a large distance, the control unit 302 of the NAN device 106 may determine not to perform the detected service. On the other hand, if the NAN device providing the detected service is at a short distance, the control unit 302 of the NAN device 106 may determine to perform the detected service. The control unit 302 of the NAN device 106 may make the determination based on user instructions.

The service search performed in step S502 may be an unsolicited service search instead of a solicited one. In such a case, in step S503, the NAN device 106 waits for a Publish message transmitted from other NAN devices. The control unit 302 of the NAN device 106 performs the processing of step S503 after a lapse of a predetermined time since the start of the wait. The processing of step S503 may be performed if a predetermined number of services are detected.

Whether the NAN device 106 performs an unsolicited service search or a solicited service search in step S502 may be determined based on the operation mode selected by the processing of FIG. 4. Specifically, the NAN device 106 may determine to perform an unsolicited service search if the single cluster participation mode is selected. The NAN device 106 may determine to perform a solicited service search if the multiple cluster participation mode is selected. Whether to perform an unsolicited service search or a solicited service search may be determined based on user instructions or preset in the NAN device 106. Whether to perform an unsolicited service search or a solicited service search may also be determined by the activated application. If the NAN device 106 runs on a battery, the determination may be made based on the remaining level of the battery.

If the single cluster participation mode is selected as the operation mode of the NAN device 106, the NAN device 106 can search for services with saved power by performing an unsolicited service search. On the other hand, if the multiple cluster participation mode is selected as the operation mode of the NAN device 106, the NAN device 106 can give higher priority to the detection of a desired service by performing a solicited service search.

In step S502, the control unit 302 of the NAN device 106 may search for a plurality of services. In such a case, the determination of step S503 may be yes if all the desired services are detected. The determination of step S503 may be yes if a predetermined number of services is detected among the desired services. In searching for a plurality of services, the control unit 302 may display a list of detected services to the user after searching for services in a predetermined time. The processing of step S504 may be performed by the user determining whether to perform the detected services based on the displayed list.

In step S503, if the desired service is not detected (NO in step S503), the processing proceeds to step S505. In step S505, the control unit 302 of the NAN device 106 determines whether to end the service search. The control unit 302 makes the determination based on user instructions. The control unit 302 may determine to end the service search based on the fact that the service search has been performed a predetermined number of times. The control unit 302 may determine to end the service search based on the fact that the service search has been performed for a predetermined time. If the control unit 302 of the NAN device 106 determines to end the service search (YES in step S505), the flow of the present flowchart is ended. On the other hand, if the control unit 302 determines not to end the service search (NO in step S505), the processing proceeds to step S506. In step S506, the control unit 302 of the NAN device 106 determines whether another NAN cluster is detected. Specifically, the NAN device 106 determines whether a NAN Discovery Beacon of a NAN device participating in a NAN cluster different from the NAN cluster in which the NAN device 106 participates is received. The NAN device 106 may determine whether a NAN Synchronization Beacon is received, instead of or in addition to the NAN Discovery Beacon. In step S506, the NAN device 106 receives the signal during DWs. However, this is not restrictive, and the signal may be received outside DWs. The signal may be received in a step prior to the prior step. If no other NAN cluster is determined to be detected (NO in step S506), the processing returns to step S502. If another NAN cluster is determined to be detected (YES in step S506), the processing proceeds to step S507. In step S507, the control unit 302 of the NAN device 106 obtains the CG of the detected NAN cluster, and determines whether the obtained CG is higher than that of the NAN cluster in which the NAN device 106 participates.

If the CG of the detected NAN cluster is higher than that of the NAN cluster in which the NAN device 106 participates (YES in step S507), the processing proceeds to step S510. In step S510, the control unit 302 of the NAN device 106 merges with the detected NAN cluster. Specifically, the NAN device 106 joins the detected NAN cluster having the high CG and leaves the NAN cluster in which the NAN device 106 has originally participated.

On the other hand, if the CG of the detected NAN cluster is lower than or equal to that of the NAN cluster in which the NAN device 106 participates (NO in step S507), the processing proceeds to step S508. In step S508, the control unit 302 of the NAN device 106 determines whether the operation mode is the multiple cluster participation mode. If the operation mode of the NAN device 106 is determined to be not the multiple cluster participation mode, i.e., to be the single cluster participation mode (NO in step S508), the processing returns to step S502. On the other hand, if the operation mode of the NAN device 106 is determined to be the multiple cluster participation mode (YES in step S508), the processing proceeds to step S509. In step S509, the control unit 302 of the NAN device 106 performs participation processing for joining the detected NAN cluster. In such a case, the NAN device 106 does not leave the NAN cluster in which the NAN device 106 has originally participated. After the end of the participation processing for joining the detected NAN cluster (step S509) or the merge processing (step S510), the processing returns to step S502. In step S502, the control unit 302 of the NAN device 106 performs a service search in the newly joined NAN cluster. If the NAN device 106 participates in a plurality of NAN clusters, the control unit 302 of the NAN device 106 may perform a service search in the NAN cluster in which the NAN device 106 has already participated in addition to the newly joined NAN cluster.

If the control unit 302 of the NAN device 106 joins the new NAN cluster in step S509, performs a service search in step S502, and is unable to detect the desired service, the control unit 302 may leave the newly joined NAN cluster.

In the present flowchart, after the processing of step S501, the control unit 302 of the NAN device 106 may skip steps S502 to S505 and perform the processing of step S506. In such a case, the processing of step S502 is performed after the processing of step S509 or S510 is performed.

In the present flowchart, the control unit 302 of the NAN device 106 determines whether the CG of the detected NAN cluster is higher than that of the NAN cluster in which the NAN device 106 participates, and then determines whether the operation mode of the NAN device 106 is the multiple cluster participation mode. However, this is not restrictive. The control unit 302 may determine the operation mode of the NAN device 106 first, and then determine whether the CG of the detected NAN cluster is higher than that of the NAN cluster in which the NAN device 106 participates. Specifically, if yes in step S506, the processing proceeds to step S508. In step S508, if the operation mode of the NAN device 106 is determined to be the multiple cluster participation mode (YES in step S508), the control unit 302 of the NAN device 106 performs the processing of step S507. If the CG of the detected NAN cluster is determined to be higher than that of the NAN cluster in which the NAN device 106 participates (YES in step S507), the processing proceeds to step S510. On the other hand, if the CG of the detected NAN cluster is determined to be not higher than that of the NAN cluster in which the NAN device 106 participates (NO in step S507), the processing proceeds to step S509. In step S508, if the operation mode of the NAN device 106 is determined to be not the multiple cluster participation mode (NO in step S508), the control unit 302 of the NAN device 106 performs the processing of step 507. If the CG of the detected NAN cluster is determined to be higher than that of the NAN cluster in which the NAN device 106 participates (YES in step S507), the processing proceeds to step S510. On the other hand, if the CG of the detected NAN cluster is determined to be not higher than that of the NAN cluster in which the NAN device 106 participates (NO in step S507), the processing returns to step S502.

In the present flowchart, if the desired service is unable to be detected even in a case where service search is performed for a predetermined time, the service search may be ended. In such a case, the control unit 302 may notify the user of the NAN device 106 that the desired service is unable to be detected. The predetermined time is preset in the NAN device 106. The predetermined time may be determined by the application activated on the NAN device 106, or may be set by the user. The service search may be ended based on the fact that the service search has been performed a predetermined number of times, instead of for the predetermined time. The flow of the present flowchart may be ended based on user instructions while the flow of the present flowchart is in process.

If the NAN device 106 participates in a plurality of NAN clusters, the communication unit 306 needs to be activated during the DWs of the respective NAN clusters, and the power consumption increases accordingly. In the case of the single cluster participation mode, the processing returns from step S508 to step S502, whereby higher priority can be given to power saving performance due to the participation of the NAN device 106 in only one NAN cluster.

In the case of the multiple cluster participation mode, the NAN device 106 also joins a NAN cluster having a CG lower than that of the NAN cluster in which the NAN device 106 participates, and performs a service search, whereby a desired service is more likely to be detected. A NAN device participating in a low-CG NAN cluster does not need to merge with a high-CG NAN cluster detected if NAN devices participating in the low-CG NAN cluster are performing data transmission and reception with each other. NAN devices participating in a NAN cluster having a CG lower than that of the NAN cluster in which the device itself participates therefore do not always merge with the NAN cluster in which the device itself participates. In the case of the multiple cluster participation mode, a desired service is therefore more likely to be detected if the NAN device 106 joins even a NAN cluster having a CG lower than that of the NAN cluster in which the NAN device 106 participates, and performs a service search.

Figure 6:
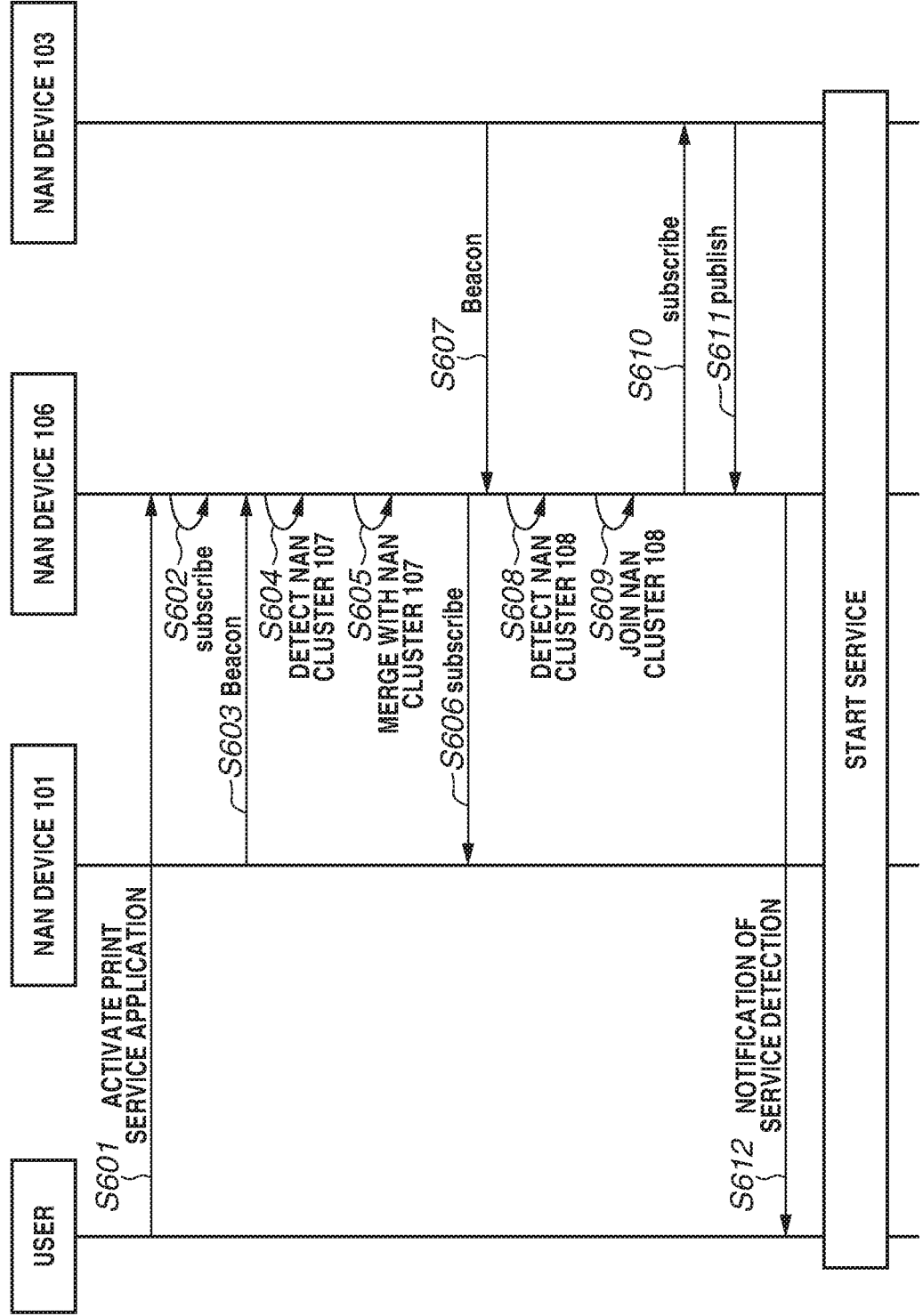
FIG. 6 is a sequence diagram illustrating processing performed when the NAN device performs a service search in a multiple cluster participation mode.

FIG. 6 is a sequence diagram illustrating processing performed by the NAN device 106 when the NAN device 106 performs a service search in the multiple cluster participation mode.

In step S601, the user initially activates the print service application of the NAN device 106. Applications related to services other than the print service may be activated here. The NAN device 106 starts wireless communication compliant with the Wi-Fi NAN standard based on the activation of the print service application. Since an application using a print service is activated, the NAN device 106 selects the multiple cluster participation mode as its operation mode based on the flowchart of FIG. 4.

Starting wireless communication compliant with the Wi-Fi NAN standard, the NAN device 106 forms a NAN cluster. The NAN devices 106 performs a service search in the NAN cluster formed by the NAN devices 106. Specifically, the NAN device 106 performs a solicited service search on NAN devices participating in the NAN cluster formed by the NAN device 106. In step S602, the NAN device 106 transmits a Subscribe message for inquiring the NAN devices participating in the NAN cluster whether a print service can be provided. At this point in time, however, there is no other NAN device participating in the NAN cluster, or no other NAN device participating in the NAN cluster is capable of providing a print service. The NAN device 106 therefore receives no Publish message.

In step S603, the NAN device 106 then receives a NAN Discovery Beacon from the NAN device 101 which participates in the NAN cluster 107. In step S604, the NAN device 106 detects the NAN cluster 107 by receiving the NAN Discovery Beacon. The NAN device 106 may detect the NAN cluster 107 by receiving a NAN Synchronization Beacon. Since the Master Preference and Random Factor of the NAN cluster formed by the NAN device 106 are set to 0 for a predetermined time, the CG of the NAN cluster is lower than that of the NAN cluster 107. In step S605, the NAN device 106 therefore merges with the NAN cluster 107.

Alternatively, the NAN device 106 does not need to form a NAN cluster when starting wireless communication compliant with the Wi-Fi NAN standard. In such a case, if the NAN device 106 receives a NAN Discovery Beacon, the NAN device 106 joins the NAN cluster in which the NAN device transmitting the signal participates. A NAN Synchronization Beacon be received instead of a NAN Discovery Beacon. If a plurality of NAN clusters is detected, the NAN device 106 joins a NAN cluster having the highest CG. The NAN device 106 may join a NAN cluster that is the first detected or a NAN cluster that is at a distance closest to the NAN device 106. The NAN cluster to join may be determined based on user instructions.

In step S606, the NAN device 106 participating in the NAN cluster 107 performs a service search in the NAN cluster 107. Specifically, the NAN device 106 performs a solicited service search on the NAN devices 101 and 102 participating in the NAN cluster 107. The NAN device 106 transmits, to the NAN devices 101 and 102 participating in the NAN cluster 107, a Subscribe message for inquiring whether a print service can be provided. However, the NAN devices 101 and 102 participating in the NAN cluster 107 are not capable of providing a print service and therefore do not transmit a Publish message as a response.

Failing to detect a NAN device providing the desired service within the NAN cluster 107 in which the NAN device 106 participates, the NAN device 106 waits for a NAN Discovery Beacon from another NAN cluster. In step S607, the NAN device 106 receives a NAN Discovery Beacon from the NAN device 103 participating in the NAN cluster 108. A NAN Synchronization Beacon may be received instead of a NAN Discovery Beacon.

In step S608, the NAN device 106 detects the NAN cluster 108 by the receipt of the NAN Discovery Beacon from the NAN device 103. Since the NAN cluster 108 has a CG lower than that of the NAN cluster 107, the NAN device 106 does not merge with the NAN cluster 108. In step S609, the NAN device 106 joins the NAN cluster 108 since the operation mode of the NAN device 106 is the multiple cluster participation mode.

In step S610, the NAN device 106 participating in the NAN cluster 108 performs a service search in the NAN cluster 108. Specifically, the NAN device 106 performs a solicited service search on the NAN devices participating in the NAN cluster 108. The NAN device 106 transmits, to the NAN devices participating in the NAN cluster 108, a Subscribe message for inquiring whether a print service can be provided. The NAN device 106 may perform a service search on the NAN devices participating in the NAN cluster 107 again because a new NAN device may have joined the NAN cluster 107.

The NAN device 103 can provide a print service. In step S611, the NAN device 103 therefore transmits a Publish message to the NAN device 106. In step S612, the NAN device 106, detecting a print service which is the desired service, notifies the user of the detection of the service. This notification is displayed on a monitor screen provided on the NAN device 106 and thereby given to the user. If Publish messages are received from a plurality of NAN devices as a result of the service search, the NAN device 106 may display a list of the NAN devices transmitting the Publish messages. In such a case, the user may determine or the NAN device 106 may autonomously determine a service provided by which NAN device for use. Step S612 may be skipped. The NAN device 106 detecting a print service starts the print service based on the specifications of the print service.

The service searches performed in steps S602, S606, and S610 may be unsolicited service searches instead of solicited service searches. In such a case, the NAN device 106 searches for a desired service by waiting for a Publish message transmitted from a NAN device participating in the NAN cluster under the service search for a predetermined time.

In performing the service searches in steps S602, S606, and S610, the NAN device 106 may search for a plurality of services. When the NAN device 106 makes the notification of service detection to the user in step S612, the NAN device 106 may display a list of detected services on the monitor screen of the NAN device 106. In such a case, which service to use may be determined by the user or autonomously by the NAN device 106.

In the present sequence, if the operation mode is set to the multiple cluster participation mode and a NAN cluster having a CG lower than that of the NAN cluster in which the NAN device 106 participates is detected, the NAN device 106 joins the detected NAN cluster as well. This enables the NAN device 106 to also perform a service search in the detected NAN cluster, so that a NAN device capable of providing the desired service is more likely to be detected.

Figure 7:
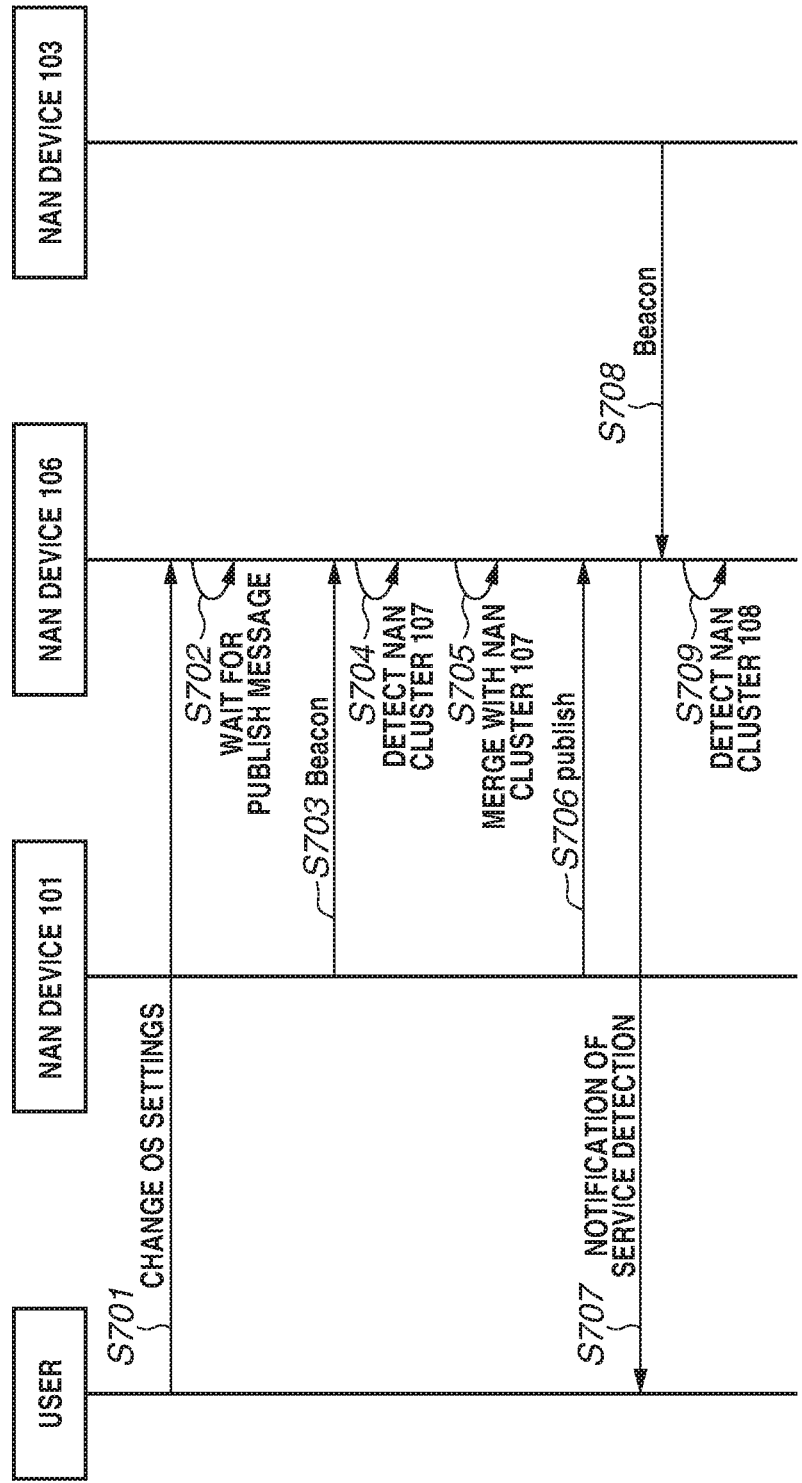
FIG. 7 is a sequence diagram illustrating processing performed when the NAN device performs a service search in a single cluster participation mode.

FIG. 7 is a sequence diagram illustrating processing performed by the NAN device 106 when the NAN device 106 performs a service search in the single cluster participation mode.

In step S701, the user changes the OS settings of the NAN device 106 and starts wireless communication compliant with the Wi-Fi NAN standard. If the OS settings of the NAN device 106 are changed and wireless communication compliant with the Wi-Fi NAN standard is started, the wireless communication compliant with the Wi-Fi NAN standard is considered to be started for the purpose of detecting a service with saved power. The single cluster participation mode is therefore selected.

In step S702, the NAN device 106 forms a NAN cluster by starting the wireless communication compliant with the Wi-Fi NAN standard, and performs a service search in the formed NAN cluster. In the present sequence, the NAN device 106 performs an unsolicited service search, and thus waits for a Publish message for a predetermined time. The NAN device 106 may perform a solicited service search. In steps S703 to S705, the NAN device 106 performs processing similar to that of steps S603 to S605 in FIG. 6.

In step S706, the NAN device 106 performs a service search in the NAN cluster 107 in which the NAN device 106 participates. The NAN device 106 receives a Publish message transmitted from the NAN device 101 participating in the NAN cluster 107.

In step S707, the NAN device 106 notifies the user of the service detection based on the received Publish message. Specifically, the NAN device 106 displays a list of detected services on the monitor screen of the NAN device 106. The user determines a desired service from the displayed list. The service may be autonomously determined by the NAN device 106. In such a case, step S707 may be skipped.

The services included in the Publish message received in step S706 do not include a desired service. The NAN device 106 therefore does not start a service.

The NAN device 106 waits for a NAN Discovery Beacon transmitted from a NAN device participating in another NAN cluster. In step S708, the NAN device 106 receives a NAN Discovery Beacon from the NAN device 103 participating in the NAN cluster 108. In step S709, the NAN device 106 thereby detects the NAN cluster 108. A NAN Synchronization Beacon may be used instead of a NAN Discovery Beacon.

Since the NAN cluster 108 has a CG lower than that of the NAN cluster 107, the NAN device 106 does not merge with the NAN cluster 108. Since the operation mode of the NAN device 106 is the single cluster participation mode, the NAN device 106 does not join the newly detected NAN cluster 108.

If the single cluster participation mode is selected and a NAN cluster having a CG lower than that of the NAN cluster in which the NAN device 106 participates is detected, the NAN device 106 does not join the detected NAN cluster. If the NAN device 106 joins a plurality of NAN clusters, the communication unit 306 of the NAN device 106 needs to be activated during the DWs of the respective NAN clusters in which the NAN device 106 participates, and the power consumption increases accordingly. In the case of the single cluster participation mode, higher priority can therefore be given to power saving performance by joining only one NAN cluster.

Figure 8:
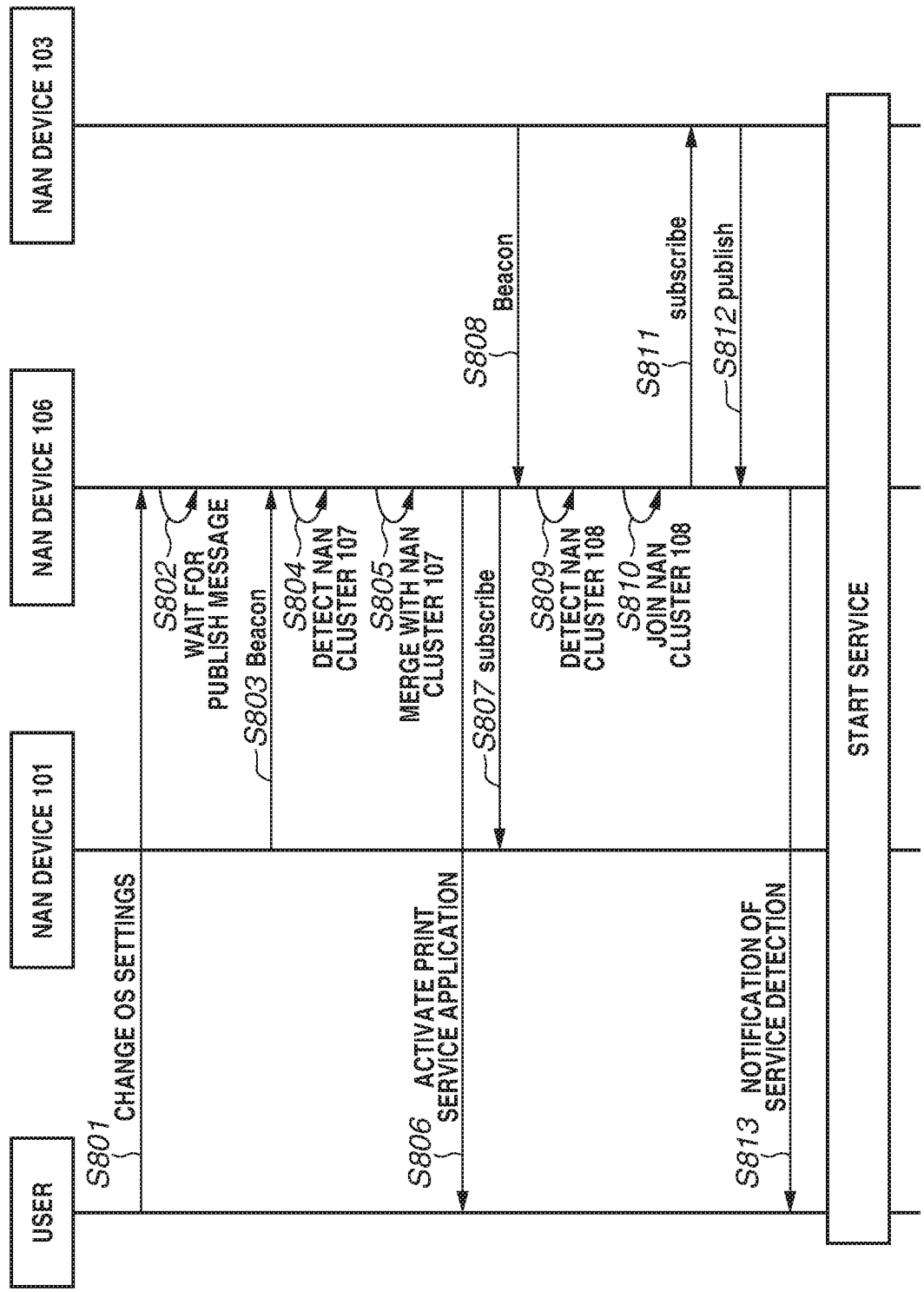
FIG. 8 is a sequence diagram illustrating processing performed when the NAN device starts wireless communication compliant with a Wi-Fi NAN standard, switches an operation mode, and performs a service search.

FIG. 8 is a sequence diagram illustrating processing performed by the NAN device 106 when the NAN device 106 starts wireless communication compliant with the Wi-Fi NAN standard, activates an application, and then performs a service search.

Steps S801 to S805 are similar to steps S701 to S705 of FIG. 7. Here, the single cluster participation mode is selected as the operation mode.

In step S806, the user activates the print service application of the NAN device 106. Since the print service application is activated, the operation mode is selected again and the multiple cluster participation mode is selected. Steps S807 to S813 are similar to steps S606 to S612 of FIG. 6, respectively.

As described above, even after the operation mode is once selected, the NAN device 106 may select the operation mode again, for example, based on activation of an application. If the NAN device 106 is participating in a plurality of NAN clusters, the NAN device 106 may switch the operation mode to the single cluster participation mode. If the operation mode of the NAN device 106 is switched from the multiple cluster participation mode to the single cluster participation mode, the NAN device 106 may leave a NAN cluster having a CG lower than that of the NAN cluster in which the NAN device 106 participates.

The NAN device 106 can perform a service search in an optimum operation mode by switching the operation mode of the NAN device 106 as needed.

Figure 9:
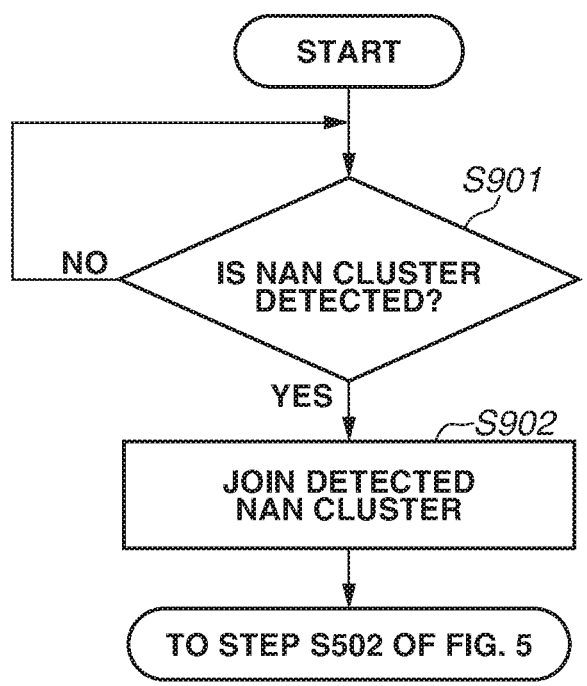
FIG. 9 is a flowchart illustrating processing performed when the NAN device performs a service search.

FIG. 9 is a flowchart illustrating processing that is implemented by the control unit 302 reading and executing a program stored in the storage unit 301 when the NAN device 106 performs a service search.

The flow of the present flowchart is started if the NAN device 106 starts wireless communication compliant with the Wi-Fi NAN standard. The wireless communication compliant with the Wi-Fi NAN standard is started, for example, based on activation of the print service application of the NAN device 106. The service to be provided by the application activated here is not limited to a print service. The wireless communication compliant with the Wi-Fi NAN standard may be started based on a change in the OS settings of the NAN device 106. The wireless communication compliant with the Wi-Fi NAN standard may be started based on power-on of the NAN device 106. If the starting trigger is the same as that for the flow of the flowchart of FIG. 4, the flow of the flowchart of FIG. 4 is started first. The flow of the present flowchart is started after that of FIG. 4 ends. The NAN device 106 may perform the processing of the flowcharts of FIGS. 4 and 9 in parallel.

In step S901, the control unit 302 of the NAN device 106 starts wireless communication compliant with the Wi-Fi NAN standard, and determines whether a NAN cluster is detected. The processing of this step is similar to that of step S506. The NAN device 106 in the present flowchart does not form a NAN cluster when starting wireless communication compliant with the Wi-Fi NAN standard. The NAN device 106 in the present flowchart waits for a NAN Discovery Beacon transmitted from another NAN device participating in a NAN cluster. The NAN device 106 may wait for a NAN Synchronization Beacon.

If no NAN cluster is determined to be detected (NO in step S901), the processing returns to step S901. On the other hand, if a NAN cluster is determined to be detected (YES in step S901), the processing proceeds to step S902. In step S902, the control unit 302 of the NAN device 106 joins the NAN cluster detected in step S901. If a plurality of NAN clusters is detected in step S901, the NAN device 106 joins a NAN cluster having the highest CG. The NAN device 106 may join a NAN cluster that is the first detected or a NAN cluster that is at a distance closest to the NAN device 106. The NAN cluster to join may be determined based on user instructions. After the processing of step S902, the control unit 302 of the NAN device 106 performs the processing of step S502 and subsequent steps in FIG. 5.

A second exemplary embodiment will be described below. The present exemplary embodiment deals with processing in a case where a plurality of NAN clusters is detected in receiving a NAN Discovery Beacon or a NAN Synchronization Beacon from another NAN cluster.

A configuration of networks in which NAN devices according to the present exemplary embodiment participate is similar to that of FIG. 1. A functional configuration of the NAN devices according to the present exemplary embodiment is similar to that of FIG. 2. A hardware configuration of the NAN devices according to the present exemplary embodiment is similar to that of FIG. 3. A flowchart illustrating processing that is performed when a NAN device according to the present exemplary embodiment selects an operation mode is similar to that of FIG. 4.

Figure 10:
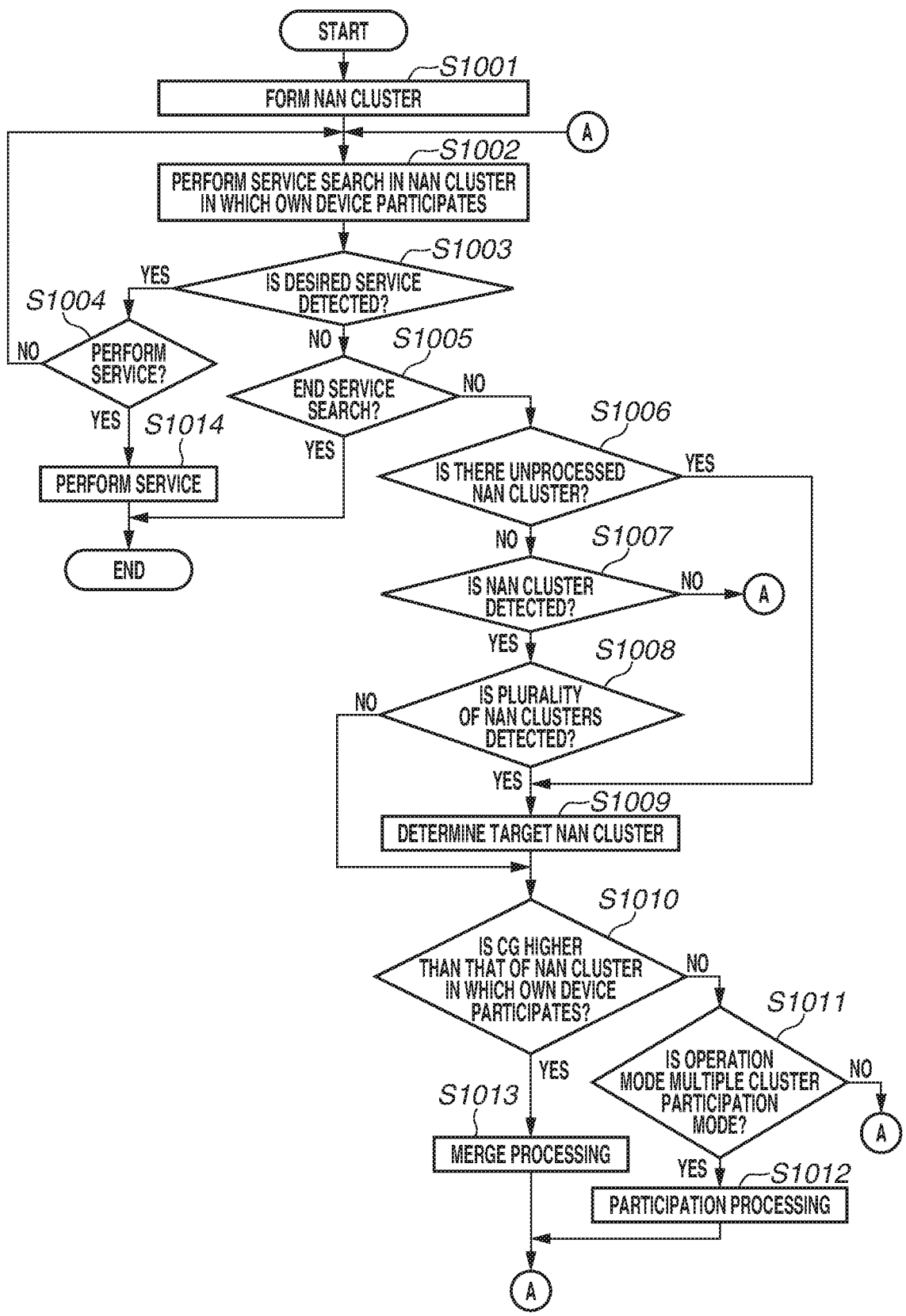
FIG. 10 is a flowchart illustrating processing performed when a NAN device forming a NAN cluster detects a plurality of NAN clusters and searches for a service.

FIG. 10 is a flowchart illustrating processing that is implemented by the control unit 302 reading and executing a program stored in the storage unit 301 when the NAN device 106 forming a NAN cluster detects a plurality of NAN clusters and searches for a service.

The flow of the present flowchart is started if the NAN device 106 starts wireless communication compliant with the Wi-Fi NAN standard. The wireless communication compliant with the Wi-Fi NAN standard is started, for example, based on activation of the print service application of the NAN device 106. The service to be provided by the application activated here is not limited to a print service. The wireless communication compliant with the Wi-Fi NAN standard may be stated based on a change in the OS settings of the NAN device 106. The wireless communication compliant with the Wi-Fi NAN standard may be started based on power-on of the NAN device 106. If the starting trigger is the same as that for the flow of the flowchart of FIG. 4, the flow of the flowchart of FIG. 4 is started first. The flow of the present flowchart is started after that of FIG. 4 is ended. The NAN device 106 may perform the processing of the flowcharts of FIGS. 4 and 10 in parallel.

The processing of steps S1001 to S1005 is similar to that of steps S501 to S505 of FIG. 5, respectively. The processing of step S1014 is similar to that of step S511 of FIG. 5. If a plurality of NAN clusters is detected in step S1007 to be described below and there is an unprocessed NAN cluster not subjected to the processing of step S1012 or S1013 to be described below, then the determination of step S1004 may be no.

In step S1005, if a service search is determined not to be ended (NO in step S1005), the processing proceeds to step S1006. In step S1006, the control unit 302 of the NAN device 106 determines whether there is an unprocessed NAN cluster. An unprocessed NAN cluster refers to a NAN cluster that has not been subjected to the processing of step S1012 or S1013 to be described below among NAN clusters detected in step S1007 to be described below. If it is determined that there is an unprocessed NAN cluster (YES in step S1006), the processing proceeds to step S1009. On the other hand, if it is determined that there is no unprocessed NAN cluster (NO in step S1006), the processing proceeds to step S1007. If a plurality of NAN clusters has not been detected, the determination of step S1006 by the control unit 302 of the NAN device 106 is no. Alternatively, step S1006 may be skipped.

In step S1007, the control unit 302 of the NAN device 106 determines whether a NAN cluster is detected. If a NAN cluster having been subjected to the processing of step S1012 to be described below is detected again, the determination of step S1007 may be no. If no NAN cluster is determined to be detected (NO in step S1007), the processing returns to step S1002. If a NAN cluster is determined to be detected (YES in step S1007), the processing proceeds to step S1008. In step S1008, the control unit 302 of the NAN device 106 determines whether a plurality of NAN clusters is detected.

If a plurality of NAN clusters is not detected (NO in step S1008), i.e., if a single NAN cluster is detected, the processing proceeds to step S1010. On the other hand, if a plurality of NAN clusters is detected (YES in step S1008), the processing proceeds to step S1009. In step S1009, the control unit 302 determines a target NAN cluster to be subjected to the processing of step S1010 and subsequent steps. The target NAN cluster is determined in descending order of the CG. The target NAN cluster may be determined in order of detection by the NAN device 106 or in ascending order of distance from the NAN device 106. The target NAN cluster may be determined based on user instructions. One or more target NAN clusters may be determined. The processing of steps S1010 to S1013 is similar to that of steps S507 to S510 of FIG. 5, respectively. In step S1011, if the operation mode of the NAN device 106 is determined to be not the multiple cluster participation mode (NO in step S1011), the processing returns to step S1002.

After the processing of step S1012 or S1013, the processing returns to step S1002. If a plurality of target NAN clusters is determined in step S1009, the control unit 302 of the NAN device 106 may perform the processing of either step S1012 or step S1013 on all the NAN clusters determined to be the target NAN clusters. The processing may be controlled to proceed to step S1002 if the processing of step S1012 or S1013 has been performed on all the target NAN clusters.

In the present flowchart, if a desired service is unable to be detected even in a case where service search is performed for a predetermined time of service search, the service search may be ended. In such a case, the control unit 302 may notify the user of the NAN device 106 that the desired service is unable to be detected. The predetermined time is preset in the NAN device 106. The predetermined time may be determined by the application activated on the NAN device 106, or may be set by the user. The flow of the present flowchart may be ended based on user instructions while the flow of the present flowchart is in process.

In the present flowchart, the control unit 302 of the NAN device 106 determines whether the CG of the detected NAN cluster is higher than that of the NAN cluster in which the NAN device 106 participates, and then determines whether the operation mode of the NAN device 106 is the multiple cluster participation mode. However, this is not restrictive. The control unit 302 may determine the operation mode of the NAN device 106 first, and then determine whether the CG of the detected NAN cluster is higher than that of the NAN cluster in which the NAN device 106 participates. Specifically, after step S1009, the processing proceeds to step S1011. In step S1011, if the operation mode of the NAN device 106 is determined to be the multiple cluster participation mode (YES in step S1011), the control unit 302 of the NAN device 106 performs the processing of step S1010. If the CG of the detected NAN cluster is determined to be higher than that of the NAN cluster in which the NAN device 106 participates (YES in step S1010), the processing proceeds to step S1013. On the other hand, if the CG of the detected NAN cluster is determined to be not higher than that of the NAN cluster in which the NAN device 106 participates (NO in step S1010), the processing proceeds to step S1012. In step S1011, if the operation mode of the NAN device 106 is determined to be not the multiple cluster participation mode (NO in step S1011), the control unit 302 of the NAN device 106 performs the processing of step S1010. If the CG of the detected NAN cluster is determined to be higher than that of the NAN cluster in which the NAN device 106 participates (YES in step S1010), the processing proceeds to step S1013. On the other hand, if the CG of the detected NAN cluster is determined to be not higher than that of the NAN cluster in which the NAN device 106 participates (NO in step S1010), the processing returns to step S1002.

Figure 11:
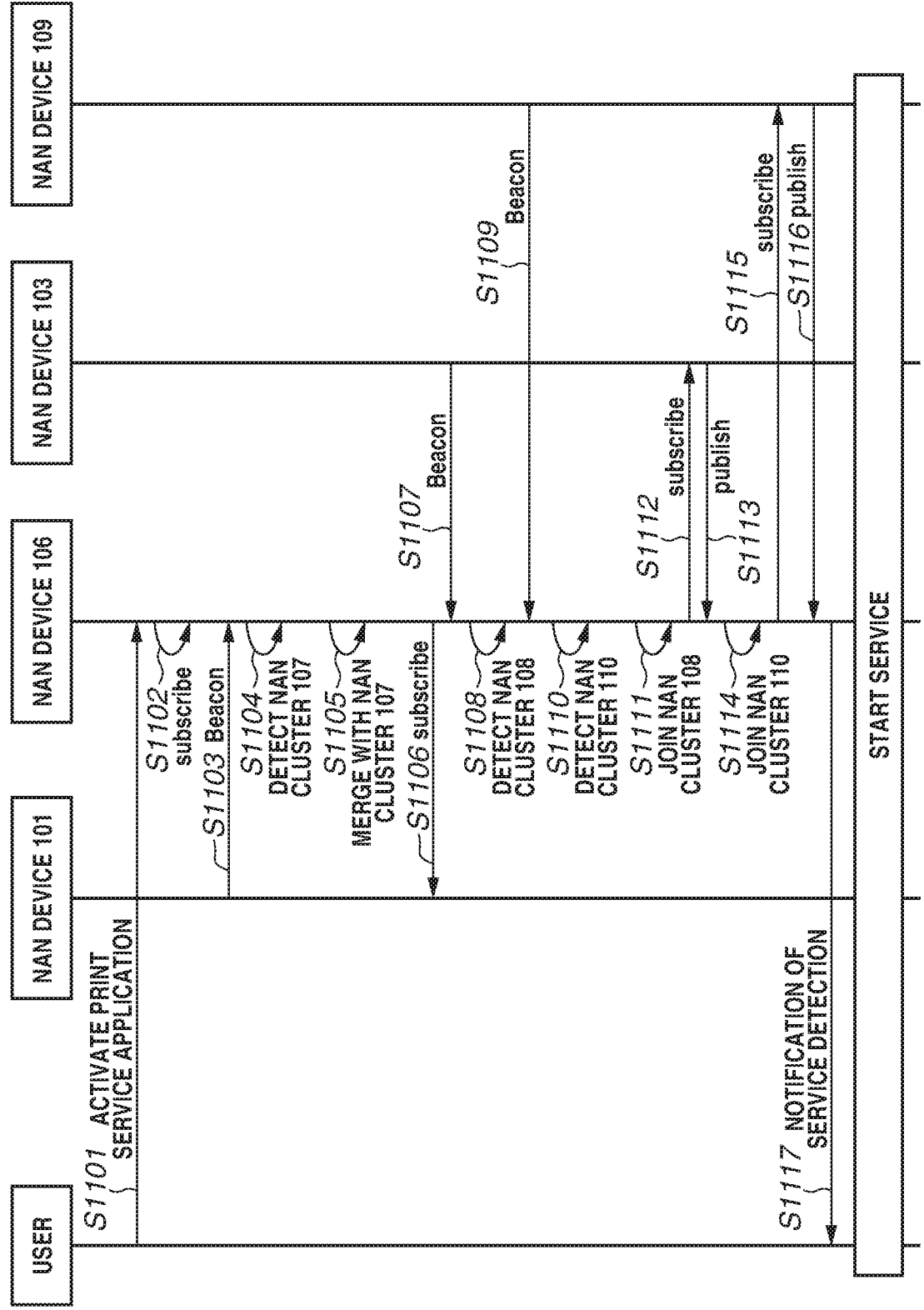
FIG. 11 is a sequence diagram illustrating processing performed when the NAN device detects a plurality of NAN clusters and starts a service.

FIG. 11 is a sequence diagram illustrating processing performed by the NAN device 106 when the NAN device 106 detecting a plurality of NAN clusters starts a service.

A NAN device 109 is a NAN device participating in a NAN cluster 110. The NAN device 109 is a communication apparatus capable of providing a print service. The NAN cluster 110 has a CG lower than that of the NAN cluster 107.

The processing of steps S1101 to S1106 is similar to that of steps S601 to S606 of FIG. 6. In step S1106, the NAN device 106 transmits, to the NAN devices 101 and 102 participating in the NAN cluster 107, a Subscribe message for inquiring whether a print service can be provided. The NAN devices 101 and 102 participating in the NAN cluster 107 are not capable of providing a print service, and therefore do not transmit a Publish message as a response.

Failing to detect a NAN device providing the desired service in the same NAN cluster, the NAN device 106 waits for a NAN Discovery Beacon from other NAN clusters. The NAN device 106 may wait for a NAN Synchronization Beacon.

In step S1107, the NAN device 106 receives a NAN Discovery Beacon from the NAN device 103 participating in the NAN cluster 108. In step S1108, the NAN device 106 detects the NAN cluster 108 by the receipt of the NAN Discovery Beacon from the NAN device 103. The NAN device 106 may detect the NAN cluster 108 by receipt of a NAN Synchronization Beacon. Since the NAN cluster 108 has a CG lower than that of the NAN cluster 107, the NAN device 106 does not merge with the NAN cluster 108.

In step S1109, the NAN device 106 receives a NAN Discovery Beacon from the NAN device 109 participating in the NAN cluster 110. A NAN Synchronization Beacon may be received instead. In step S1110, the NAN device 106 detects the NAN cluster 110 by the reception of the NAN Discovery Beacon from the NAN device 109. A NAN Synchronization Beacon may be received instead. Since the NAN cluster 110 has a CG lower than that of the NAN cluster 107, the NAN device 106 does not merge with the NAN cluster 110.

Since a plurality of NAN clusters is detected, the NAN device 106 determines a target NAN cluster. When the CGs of the detected NAN clusters 108 and 110 are compared, the NAN cluster 108 has a higher CG. The NAN device 106 thus determines the NAN cluster 108 to be a target NAN cluster first.

In step S1111, the NAN device 106 joins the NAN cluster 108 since the operation mode of the NAN device 106 is the multiple cluster participation mode. In step S1112, the NAN device 106 participating in the NAN cluster 108 performs a service search in the NAN cluster 108. Specifically, the NAN device 106 performs a solicited service search on the NAN devices 103, 104, and 105 participating in the NAN cluster 108. The NAN device 106 transmits, to the NAN devices 103, 104, and 105 participating in the NAN cluster 108, a Subscribe message for inquiring whether a print service can be provided. The NAN device 106 may perform a service search on the NAN devices participating in the NAN cluster 107 again because a new NAN device may have joined the NAN cluster 107. The NAN device 103 is capable of providing a print service. In step S1113, the NAN device 103 therefore transmits a Publish message to the NAN device 106.

Although a desired service is detected, the NAN device 106 continues the service search since the service search has not been performed on all the unprocessed NAN clusters.

The NAN device 106 determines the NAN cluster 110, an unprocessed NAN cluster, to be the next target NAN cluster.

In step S1114, the NAN device 106 joins the NAN cluster 110 since the operation mode of the NAN device 106 is the multiple cluster participation mode. In step S1115, the NAN device 106 participating in the NAN cluster 110 performs a service search in the NAN cluster 110. Specifically, the NAN device 106 performs a solicited service search on the NAN devices participating in the NAN cluster 110. The NAN device 106 transmits, to the NAN devices participating in the NAN cluster 110, a Subscribe message for inquiring whether a print service can be provided. The NAN device 106 may perform a service search on the NAN devices participating in the NAN cluster 107 again because a new NAN device may have joined the NAN cluster 107. In step S1116, the NAN device 109 transmits a Publish message to the NAN device 106 since the NAN device 109 is capable of providing a print service.

In step S1117, the NAN device 106 notifies the user of the two print services detected. The notification of service detection may be once issued when a print service is detected in step S1113, and again when another print service is detected in step S1116. Since the user is notified of all the plurality of print services detected, the user can select a print service to use from among the plurality of print services.

Figure 12:
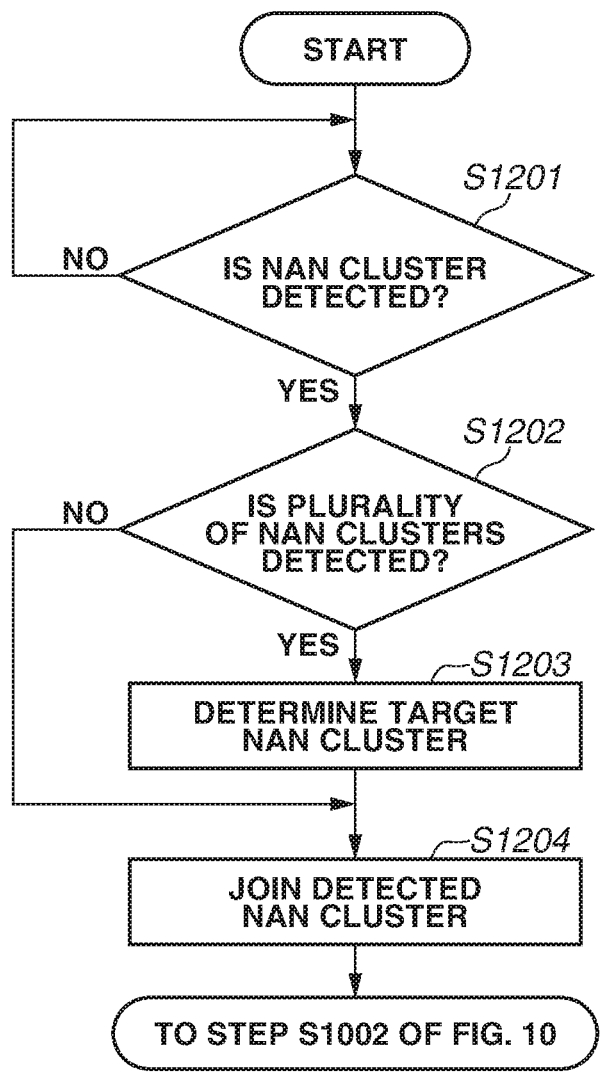
FIG. 12 is a flowchart illustrating processing performed when the NAN device searches for a service and detects a plurality of NAN clusters.

FIG. 12 is a flowchart illustrating processing that is implemented by the control unit 302 reading and executing a program stored in the storage unit 301 when the NAN device 106 searches for a service and a plurality of NAN clusters is detected. The flow of the present flowchart is started if the NAN device 106 starts wireless communication compliant with the Wi-Fi NAN standard. The wireless communication compliant with the Wi-Fi NAN standard is started, for example, based on activation of the print service application of the NAN device 106. The service to be provided by the application activated here is not limited to a print service. The wireless communication compliant with the Wi-Fi NAN standard may be started based on a change in the OS settings of the NAN device 106. The wireless communication compliant with the Wi-Fi NAN standard may be started based on power-on of the NAN device 106. If the starting trigger is the same as that for the flow of the flowchart of FIG. 4, the flow of the flowchart of FIG. 4 is started first. The flow of the present flowchart is started after that of FIG. 4 ends. The NAN device 106 may perform the processing of the flowcharts of FIGS. 4 and 12 in parallel.

In step S1201, the control unit 302 of the NAN device 106 starts wireless communication compliant with the Wi-Fi NAN standard, and determines whether a NAN cluster is detected. The processing of this step is similar to that of step S506 of FIG. 5. The NAN device 106 in the present flowchart does not form a NAN cluster when starting wireless communication compliant with the Wi-Fi NAN standard. The NAN device 106 in the present flowchart waits for a NAN Discovery Beacon transmitted from another NAN device participating in a NAN cluster. The NAN device 106 may wait for a NAN Synchronization Beacon.

If no NAN cluster is determined to be detected (NO in step S1201), the processing returns to step S1201. On the other hand, if a NAN cluster is determined to be detected (YES in step S1201), the processing proceeds to step S1202. In step S1202, the control unit 302 of the NAN device 106 determines whether a plurality of NAN clusters is detected. If a plurality of NAN clusters is not detected (NO in step S1202), i.e., if a single NAN cluster is detected, the processing proceeds to step S1204. On the other hand, if a plurality of NAN clusters is detected (YES in step S1202), the processing proceeds to step S1203. In step S1203, the control unit 302 of the NAN device 106 determines a target NAN cluster to join from among the NAN clusters detected in step S1201. The target NAN cluster is a NAN cluster having the highest CG among the NAN clusters detected in step S1201. The target NAN cluster may be a NAN cluster that is the first detected or a NAN cluster that is at the shortest distance. The target NAN cluster may be determined based on user instructions. In step S1204, the control unit 302 of the NAN device 106 joins the target NAN cluster determined in step S1203. If a single NAN cluster is detected in step S1201, the control unit 302 of the NAN device 106 joins the NAN cluster. After the processing of step S1204, the control unit 302 of the NAN device 106 performs the processing of step S1002 and subsequent steps in FIG. 10.

In the present exemplary embodiment, if a plurality of NAN clusters is detected, the NAN device 106 determines a target NAN cluster, joins or merges with the target NAN cluster, and performs a service search in the joined or merged NAN cluster. However, the NAN device 106 may join or merge with all the detected NAN clusters, and then perform a service search in the joined or merged NAN clusters.

In FIG. 9 of the first exemplary embodiment and FIG. 12 of the second exemplary embodiment, the NAN device 106 does not form a NAN cluster in starting wireless communication compliant with the Wi-Fi NAN standard. However, this is not restrictive. If, in steps S901 and S1201, no NAN cluster can be detected for a predetermine time, the NAN device 106 may form a NAN cluster. In such a case, the NAN device 106 in the flow of FIG. 9 starts the flow of FIG. 5. The NAN device 106 in the flow of FIG. 12 starts the flow of FIG. 10.

In the first and second exemplary embodiments, if the NAN device 106 is in the multiple cluster participation mode, the NAN device 106, when joining a new NAN cluster, does not leave the NAN cluster in which the NAN device 106 already participates. Now, suppose that the NAN device 106 is operating in the multiple cluster participation mode and participates in a predetermined number of NAN clusters or more. In such a case, the NAN device 106, when joining a new NAN cluster having a CG lower than those of the NAN clusters in which the NAN device 106 participates, may leave one of the NAN clusters in which the own device already participates.

In the first and second exemplary embodiments, if the NAN device 106 is operating in the multiple cluster participation mode and participates in a predetermined number of NAN clusters or more, the number of NAN clusters to participate in does not need to be increased. Specifically, suppose that the NAN device 106 participates in a predetermined number of NAN clusters or more and detects a new NAN cluster. If the detected NAN cluster has a CG higher than that of any one of the NAN clusters in which the NAN device 106 participates, the NAN device 106 merges with the detected NAN cluster. On the other hand, if the CG of the detected NAN cluster is lower than or equal to those of all the NAN clusters in which the NAN device 106 participates, the NAN device 106 does not perform the participation processing.

In the first and second exemplary embodiments, the NAN device 106 transmits and receives a Publish message and a Subscribe message during DWs. However, the NAN device 106 may transmit and receive such messages outside DWs.

In the first and second exemplary embodiments, if the CG of the detected NAN cluster is higher than that of the NAN cluster in which the NAN device 106 participates, the NAN device 106 merges with the detected NAN cluster. When merging with the detected NAN cluster, the NAN device 106 joins the detected NAN cluster and leaves the original NAN cluster. However, if the operation mode of the NAN device 106 is the multiple cluster participation mode, the NAN device 106 does not need to leave the original NAN cluster in merging with the detected NAN cluster.

In the first and second exemplary embodiments, if the NAN device 106 is operating in the multiple cluster participation mode and participates in a plurality of NAN clusters, and each of the NAN clusters satisfies a predetermined condition, the role of the NAN device 106 may be changed. For example, if the NAN device 106 in a NAN cluster has the role of a Non-Master in a Non-Sync state and a predetermined condition is satisfied, the role of the NAN device 106 may be changed to a Master. The role of the NAN device 106 may be changed to a Non-Master in a Sync state. Similarly, if the NAN device 106 has the role of a Master or a Non-Master in a Sync state, the role of the NAN device 106 may also be changed. If the role of the NAN device 106 in a NAN cluster is changed from a Non-Master in a Non-Sync state to a Master, the NAN device 106 transmits a NAN Synchronization Beacon in the DWs of the NAN cluster. The same applies if the role of the NAN device 106 is changed to a Non-Master in a Sync state.

In the first and second exemplary embodiments, if the NAN device 106 detects a NAN cluster, the NAN device 106 determines whether to perform a service search in the detected NAN cluster based on the CG of the detected NAN cluster and the operation mode of the NAN device 106. However, this is not restrictive. If the NAN device 106 is operating in the multiple cluster participation mode, the NAN device 106 may perform a service search in the detected NAN cluster regardless of the CG of the detected NAN cluster.

The first and second exemplary embodiments have been described by using a communication apparatus that performs communication compliant with the Wi-Fi NAN standard. However, the communication standard for the communication apparatus to comply with is not limited to the Wi-Fi NAN standard. The communication apparatus may be one capable of selecting a service search method if a plurality of networks compliant with IEEE 802.11 series standards other than the Wi-Fi NAN standard is detected. The networks to be detected by the communication apparatus may be ones compliant with wireless communication standards such as Bluetooth and Wireless USB.

Specifically, suppose that the communication apparatus detects, for example, a network (NW) 1 in which the communication apparatus transmits and receives predetermined signals in synchronization with a predetermined period and a NW 2 in which the communication apparatus transmits and receives predetermined signals in synchronization with a period different from that of NW 1. Suppose also that the communication apparatus can search a network in which the communication apparatus participates for a service provided by other communication apparatuses participating in the network. If the communication apparatus performs a service search in a detected network, the communication apparatus can select between a single NW participation mode in which a single network is searched for a service and a multiple network participation mode in which a plurality of networks is searched for a service. If the communication apparatus is operating in the multiple NW participation mode and detects the NWs 1 and 2, the communication apparatus performs a service search in both the NWs 1 and 2. On the other hand, if the communication apparatus is operating in the single NW participation mode, the communication apparatus compares predetermined values set for the respective detected NWs 1 and 2, and performs a service search in either one of the NWs 1 and 2 based on the result.

Suppose that, in a NW in which participating communication apparatuses transmit and receive a predetermined signal in synchronization with a predetermined period, each communication apparatus participating in the network is assigned either the role of transmitting the predetermined signal or the role of not transmitting the predetermined signal. Suppose also that the role of a communication apparatus is changed if a predetermined condition is satisfied. If a communication apparatus is operating in the multiple NW participation mode and participates in a plurality of networks, the role of the communication apparatus may be changed in each of the networks, provided that a predetermined condition is satisfied.

At least part or all of the flowcharts of the NAN device 106 illustrated in FIGS. 4, 5, 9, 10, and 12 may be implemented by hardware. In the case of hardware implementation, for example, a dedicated circuit can be formed and used on a field programmable gate array (FPGA) from a program for implementing respective steps by using a predetermined complier. A gate array circuit may be formed for hardware implementation as with an FPGA. An application specific integrated circuit (ASIC) may be used for implementation. The same applies to the sequence diagrams illustrated in FIGS. 6, 7, 8, and 11.

The steps of the flowcharts illustrated in FIGS. 4, 5, 9, 10, and 12, and the sequence diagrams illustrated in FIGS. 6, 7, 8, and 11 may be performed by a not-illustrated plurality of CPUs or apparatuses in a distributed manner.

While the exemplary embodiments have been described in detail above, exemplary embodiments of the present disclosure may also be carried out in forms such as a system, an apparatus, a method, a program, and a recording medium (storage medium). Specifically, an exemplary embodiment of the present disclosure may be applied to a system including a plurality of apparatuses (for example, a host computer, an interface device, an imaging apparatus, and a web application). An exemplary embodiment of the present disclosure may be applied to an apparatus including a single device.

An exemplary embodiment of the present disclosure can be achieved by processing for supplying a program for implementing one or more functions of the foregoing exemplary embodiments to a system or an apparatus via a network or a storage medium, and reading and executing the program by one or more processors of a computer of the system or apparatus. An exemplary embodiment of the present disclosure can also be implemented by a circuit (such as an ASIC) that implements one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present disclosure, there can be provided a communication apparatus which, if there is a plurality of networks, can selectively perform a service search in a single network or in a plurality of networks.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-211158, filed Oct. 31, 2017, which is hereby incorporated by reference herein in its entirety.

What is claimed is:

1. A communication apparatus comprising:
a participation unit configured to join a network in which participating apparatuses perform communication using a predetermined signal therebetween;
a first search unit configured to, in a case where there are a first network in which participating apparatuses perform communication using the predetermined signal therebetween and a second network in which participating apparatuses perform communication using the predetermined signal therebetween, join either the first or second networks via the participation unit based on a result of comparison between a first value set for the first network and a second value set for the second network, perform a service search in the joined network, and not perform a service search in the other network by not joining the other network;
a second search unit configured to, in a case where there are the first and second networks, join the first and second networks via the participation unit, perform a service search in the first network, and perform a service search in the second network as well; and
a selection unit configured to receive a selection to select whether to perform a service search by the first search unit or perform a service search by the second search unit.

2. The communication apparatus according to claim 1, wherein the first search unit is configured to, in a case where there are the first and second networks, the first predetermined value is higher than the second predetermined value, and the first search unit is selected by the selection unit, join the first network by using the participation unit and perform a service search in the first network, and wherein the first search unit is configured to, in a case where the second predetermined value is higher than the first predetermined value and the first search unit is selected by the selection unit, join the second network by using the participation unit and perform a service search in the second network.

3. The communication apparatus according to claim 1, wherein the second search unit is configured to, in a case where the second search unit is selected by the selection unit, join the first network by using the participation unit and perform a service search in the first network, and wherein the second search unit is configured to, in a case where a predetermined service is not detected in the service search in the first network, join the second network and perform a service search in the second network.

4. The communication apparatus according to claim 1, wherein the first search unit is configured to leave the first network when joining the second network by using the participation unit.

5. The communication apparatus according to claim 1, further comprising a detection unit configured to detect a network in which communication using the predetermined signal is performed, wherein the detection unit is configured to detect the network by receiving an informing signal transmitted by another apparatus participating in the network, the informing signal informing presence of the network.

6. The communication apparatus according to claim 5, wherein the informing signal is a Neighbor Awareness Network (NAN) Discovery Beacon compliant with a Wi-Fi NAN standard.

7. The communication apparatus according to claim 5, wherein the detection unit is configured to detect the network by receiving a synchronization signal transmitted by the another apparatus participating in the network, the synchronization signal enables apparatuses participating in the network to synchronize with one another.

8. The communication apparatus according to claim 7, wherein the synchronization signal is a NAN Synchronization Beacon compliant with a Wi-Fi NAN standard.

9. The communication apparatus according to claim 1, wherein a service search in a network in which communication using the predetermined signal is performed by receiving a notification signal transmitted by another apparatus participating in the network which provides a notification of a service provided by the another apparatus.

10. The communication apparatus according to claim 9, wherein the notification signal is a Publish message compliant with a Wi-Fi NAN standard.

11. The communication apparatus according to claim 1, wherein a service search in a network in which communication using the predetermined signal is performed is performed by transmitting an inquiry signal to another apparatus participating in the network which performs an inquiry about a service provided by the another apparatus.

12. The communication apparatus according to claim 11, wherein the inquiry signal is a Subscribe message compliant with a Wi-Fi NAN standard.

13. The communication apparatus according to claim 1, wherein the first and second search units are configured to, in a case where the apparatuses participating in the first network synchronously perform communication using the predetermined signal therebetween in a first period and the apparatuses participating in the second network synchronously perform communication using the predetermined signal therebetween in a second period, perform a service search in the first period for the first network, and perform a service search in the second period for the second network.

14. The communication apparatus according to claim 13, wherein the first period and the second period are each a Discovery Window (DW) compliant with a Wi-Fi NAN standard.

15. The communication apparatus according to claim 1, wherein the selection unit is configured to select whether to perform a service search by the first search unit or perform a service search by the second search unit, based on a user instruction.

16. The communication apparatus according to claim 1, wherein the selection unit is configured to select a service search by the second search unit according to activation of an application using a predetermined service on the communication apparatus.

17. The communication apparatus according to claim 1, wherein the selection unit is configured to select a service search by the first search unit based on a change in an operating system (OS) setting of the communication apparatus and a start of wireless communication for use in the first and second networks.

18. The communication apparatus according to claim 1,
wherein a network in which communication using the predetermined signal is performed is a NAN cluster compliant with a Wi-Fi NAN standard, and
wherein the first network is a first NAN cluster, and the second network is a second NAN cluster.

19. The communication apparatus according to claim 1, wherein the first value and the second value are each a Cluster Grade (CG) compliant with a Wi-Fi NAN standard.

20. The communication apparatus according to claim 1, wherein the predetermined signal is a NAN Synchronization Beacon compliant with a Wi-Fi NAN standard.

21. The communication apparatus according to claim 1, wherein communication compliant with a Wi-Fi NAN standard is performed in the first network and the second network.

22. A method for controlling a communication apparatus, the method causing the communication apparatus to:
join a network in which participating apparatuses perform communication using a predetermined signal therebetween;
in a case where there are a first network in which participating apparatuses perform communication using the predetermined signal therebetween and a second network in which participating apparatuses perform communication using the predetermined signal therebetween, join either the first or second networks based on a result of comparison between a first value set for the first network and a second value set for the second network, perform a service search in the joined network as a first search, and not perform a service search in the other network by not joining the other network;
in a case where there are the first and second networks, join the first and second networks, and perform a service search in the first network and in the second network as a second search; and
receiving a selection to select whether to perform a service search by the first search or perform a service search by the second search.

23. A non-transitory computer-readable recording medium on which a program for causing a computer to function as each unit of a communication apparatus is recorded, the program causing the computer to:
join a network in which participating apparatuses perform communication using a predetermined signal therebetween;
in a case where there are a first network in which participating apparatuses perform communication using the predetermined signal therebetween and a second network in which participating apparatuses perform communication using the predetermined signal therebetween, join either the first or second networks based on a result of comparison between a first value set for the first network and a second value set for the second network, perform a service search in the joined network as a first search, and not perform a service search in the other network by not joining the other network;
in a case where there are the first and second networks, join the first and second networks, and perform a service search in the first network and in the second network as a second search; and
receive a selection to select whether to perform a service search by the first search or perform a service search by the second search.

* * * * *